(12) United States Patent
Ozawa et al.

(10) Patent No.: US 11,353,109 B2
(45) Date of Patent: Jun. 7, 2022

(54) VEHICLE RANGE SWITCHING DEVICE

(71) Applicant: Toyota Jidosha Kabushiki Kaisha, Toyota (JP)

(72) Inventors: Kazuhiro Ozawa, Toyota (JP); Takahito Ozeki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 68 days.

(21) Appl. No.: 16/880,329

(22) Filed: May 21, 2020

(65) Prior Publication Data

US 2020/0370645 A1 Nov. 26, 2020

(30) Foreign Application Priority Data

May 22, 2019 (JP) .............................. JP2019-096387

(51) Int. Cl.
*F16H 61/32* (2006.01)
*F16H 63/34* (2006.01)

(52) U.S. Cl.
CPC .......... *F16H 61/32* (2013.01); *F16H 63/3466* (2013.01); *F16H 2061/326* (2013.01)

(58) Field of Classification Search
CPC ................. F16H 61/32; F16H 63/3466; F16H 2061/326; F16H 61/18; F16H 63/38
See application file for complete search history.

(56) References Cited

U.S. PATENT DOCUMENTS

2015/0285373 A1* 10/2015 Nagahori ................ F16H 61/32
475/149
2018/0328487 A1* 11/2018 Nishimoto .............. F16H 63/18

FOREIGN PATENT DOCUMENTS

| CN | 103148214 A | 6/2013 |
| JP | 58-105828 A | 6/1983 |
| JP | 2009-127856 A | 6/2009 |
| JP | 2017-150618 A | 8/2017 |

* cited by examiner

*Primary Examiner* — Victor L MacArthur
(74) *Attorney, Agent, or Firm* — Oblon, McClelland, Maier & Neustadt, L.L.P.

(57) ABSTRACT

A range switching device for switching between a plurality of shift ranges in a vehicle. In the range switching device, the shift ranges are switched depending on a rotational angle of a detent plate that has (i) a first engaged portion for maintaining an angle value of the rotational angle of the detent plate by which a parking range as one of the shift ranges is established in the vehicle and (ii) a second engaged portion for maintaining another angle value of the rotational angle of the detent plate by which a reverse running range as another one of the shift ranges is established in the vehicle. The first and second engaged portions are located in respective positions adjacent to each other in a circumferential direction about a rotational axis about which the detent plate is to be rotated.

7 Claims, 8 Drawing Sheets

US 11,353,109 B2

VEHICLE RANGE SWITCHING DEVICE

This application claims priority from Japanese Patent Application No. 2019-096387 filed on May 22, 2019, the disclosure of which is herein incorporated by reference in its entirety.

FIELD OF THE INVENTION

The present invention relates to a range switching device for a vehicle, more particularly, to prevention of non-intended range switching that could be caused in a transition of switching between a forward running range and a parking range of the vehicle.

BACKGROUND OF THE INVENTION

There is known a range switching device for a vehicle, wherein the vehicle is configured to convert a shift switching operation made by an operator of the vehicle, to an electric signal, and to electrically switch between shift ranges in the vehicle through an electric motor. Patent Document 1 discloses a construction of such a range switching device. In the range switching device disclosed in the Patent Document 1, there are provided a parking mechanism 4, a fan-shaped detent plate 32, a plurality of recessed portions 33 provided in an outer peripheral portion of the detent plate 32, and a detent spring 34 provided with a roller that is to be pressed against each of the recessed portions 33, such that the shift ranges are sequentially established by rotation of the detent plate 32.

PRIOR ART DOCUMENTS

Patent Documents

Patent Document 1: JP-2017-150618 A
Patent Document 2: JP-2009-127856 A
Patent Document 3: JP-S58-105828 A

SUMMARY OF THE INVENTION

By the way, where the range switching device disclosed in the Patent Document 1 is constructed such that P range (parking range), R range (reverse running range), N range (drive-force transmission cut-off range) and D range (forward running range) are established sequentially in this order of description by rotation of the detent plate, when the P range and the D range are to be switched to each other, the P range and the D range are switched to each other necessarily via the N range and the R range. Therefore, if an electric motor, which is provided to rotate the detent plate, is stopped due to a failure of an electric source, for example, in a switching transition between the P range and the D range, there is a risk that an unintended one of the shift ranges could be established because the P range and the D range are switched to each other necessarily via the N range and the R range.

The present invention was made in view of the background art described above. It is therefore an object of the present invention to provide a vehicle range switching device capable of preventing an intended shift range from being established in a switching transition between P range and D range. This object indicated above is achieved according to the following aspects of the present invention.

According to a first aspect of the invention, there is provided a range switching device for switching between a plurality of shift ranges in a vehicle, the range switching device comprising: an electric motor; and a detent plate that is to be rotated by the electric motor about a rotational axis, such that the shift ranges are switched depending on a rotational angle of the detent plate, wherein, while the detent plate is rotated from a state in which any one of the shift ranges is established in the vehicle, the others of the shift ranges are sequentially established in the vehicle, and when the detent plate has been rotated by 360 degrees from the state, the any one of the shift ranges is returned to be established in the vehicle, wherein the detent plate includes a plurality of engaged portions provided in an outer peripheral end portion of the detent plate, such that the engaged portions are arranged in a circumferential direction about the rotational axis, and such that each of the shift ranges is established in the vehicle when the rotational angle of the detent plate is a predetermined corresponding angle value with a corresponding one of the engaged portions being positioned in a reference position in the circumferential direction, wherein the range switching device further comprises an engaging member, such that, when each of the engaged portions is positioned in the reference position, the engaging member is to be brought into engagement with the each of the engaged portions for thereby maintaining the predetermined corresponding angle value of the rotational angle of the detent plate, wherein the shift ranges include a parking range and a forward running range, such that running of the vehicle is stopped when the parking range is established in the vehicle, and such that the vehicle is enabled to run in a forward direction when the forward running range is established in the vehicle, wherein the engaged portions include a first engaged portion and a second engaged portion, such that the parking range is established in the vehicle when the first engaged portion is positioned in the reference position, and such that the forward running range is established in the vehicle when the second engaged portion is positioned in the reference position, and wherein the first and second engaged portions are located in respective positions adjacent to each other in the circumferential direction, such that the parking range and the forward running range are to be switched directly to each other by rotation of the detent plate without via any other of the shift ranges that is other than the parking range and the forward running range. For example, the plurality of engaged portions are respective recessed portions, and the engaging member is a pressing member, such that, when each of the recessed portions is positioned in the reference position, the pressing member is to be pressed against the each of the recessed portions. Further, the range switching device may further comprises: a parking lock mechanism including a switching member; a valve mechanism including a spool valve member; a first link rod connected to the detent plate to operate the parking lock mechanism; and a second link rod connected to the detent plate to operate the valve mechanism, wherein each of the first and second link rods includes a first member, a second member, and a joint portion connecting the first and second members, wherein the first member of each of the first and second link rods is connected at one of longitudinally opposite end portions thereof to one of longitudinally opposite end portions of the second member of the each of the first and second link rods through the joint portion of the each of the first and second link rods, and is connected at the other of the longitudinally opposite end portions thereof to a connecting portion which is connected to the detent plate and which is located in a position offset from the rotational axis, wherein the second member of each of the first and second link rods is connected at the other of the longitudinally opposite end portions thereof to a corresponding one of the switching member of the parking lock mechanism and the spool valve member of the valve mechanism, such that the rotation of the detent plate causes the second member and the joint portion to be linearly moved together with the corresponding one of the switching member and the spool valve member along a straight line passing through the rotational axis, and causes the first member to be pivoted about the joint portion, and wherein each of the parking lock mechanism and the valve mechanism is to be placed in one of a plurality of operating states thereof which corresponds to a position of a corresponding one of the switching member and the spool valve member relative to another member of the each of the parking lock mechanism and the valve mechanism in a direction of the straight line passing through the rotational axis. Still further, the second member and the joint portion of each of the first and second link rods are to be reciprocatingly moved together with the corresponding one of the switching member and the spool valve member along the straight line, by the rotation of the detent plate, such that a reciprocating movement of the second member and the joint portion has a cycle corresponding to the rotation of the detent plate by 360 degrees, wherein a distance of the joint portion of the first link rod from the another member of the parking lock mechanism in the direction of the straight line is minimized when the rotational angle of the detent plate is a first angle value, and is maximized when the rotational angle of the detent plate is a third angle value, and wherein a distance of the joint portion of the second link rod from the another member of the valve mechanism in the direction of the straight line is minimized when the rotational angle of the detent plate is a second angle value that is different from the first angle value, and is maximized when the rotational angle of the detent plate is a fourth angle value that is different from the third angle value.

According to a second aspect of the invention, in the range switching device according to the first aspect of the invention, the plurality of shift ranges include, in addition to the parking range and the forward running range, a reverse running range and a drive-force transmission cut-off range, such that the vehicle is enabled to run in a reverse direction when the reverse running range is established in the vehicle, and such that transmission of a drive force is cut off when the drive-force transmission cut-off range is established in the vehicle, wherein the range switching device further comprises: the parking lock mechanism; the valve mechanism; the first link rod connected to the detent plate to operate the parking lock mechanism; and the second link rod connected to the detent plate to operate the valve mechanism, wherein each of the first and second link rods is to be is reciprocatingly moved by rotation of the detent plate, wherein the parking lock mechanism includes the switching member that is connected to the first link rod, such that the parking lock mechanism is placed in one of a plurality of operating states thereof which corresponds to a position of the switching member, and wherein the valve mechanism includes the spool valve member that is connected to the second link rod, such that the valve mechanism is placed in one of a plurality of operating states thereof which corresponds to a position of the spool valve member, and such that each of the drive-force transmission cut-off range, the forward running range and the reverse running range is to be established depending on the one of the plurality of operating states of the valve mechanism.

According to a third aspect of the invention, in the range switching device according to the second aspect of the invention, the plurality of engaged portions include four engaged portions which are arranged in the circumferential direction at an angular pitch of 90 degrees, and which correspond to the parking range, the reverse running range, the drive-force transmission cut-off range and the forward running range, respectively, wherein the four engaged portions includes, in addition to the first and second engaged portions, a third engaged portion corresponding to the drive-force transmission cut-off range, such that the drive-force transmission cut-off range is established in the vehicle when the third engaged portion is positioned in the reference position, wherein the first and third engaged portions are located in respective positions diagonal to each other in the circumferential direction, and wherein, when each of the first and second link rods is reciprocatingly moved by rotation of the detent plate, reciprocating movements of the respective first and second link rods are offset in phase from each other by 90 degrees.

According to a fourth aspect of the invention, in the range switching device according to any one of the first through third aspects of the invention, there is further provided an absolute angle sensor configured to detect the rotational angle of the detent plate.

In the range switching device according to the first aspect of the invention, while the detent plate is rotated from a state in which any one of the shift ranges is established, the others of the shift ranges are sequentially established, and when the detent plate has been rotated by one rotation from the state, the any one of the shift ranges is returned to be established. This feature arrangement makes it possible to increase a degree of freedom in designing a pattern of switching between the shift ranges, as compared with an arrangement in which the shift ranges are to be established by rotation of the detent plate by a certain angle value of the rotational angle. In connection with this feature arrangement, the parking range and the forward running range can be switched directly to each other by rotation of the detent plate without via any other of the shift ranges that is other than the parking range and the forward running range. Thus, even when the detent plate cannot be rotated, for example, due to failure of an electric source, during a switching transition between the parking range and the forward running range, it is possible to prevent an unintended one of the shift ranges from being established. Further, the first engaged portion cooperates with the engaging member to maintain a corresponding angle value of the rotational angle of the detent plate by which the parking range is established in the vehicle, while the second engaged portion cooperates with the engaging member to maintain a corresponding angle value of the rotational angle of the detent plate by which the forward running range is established in the vehicle, such that the first and second engaged portions are located in respective positions adjacent to each other in the circumferential direction. Owing to this arrangement, the parking range and the forward running range can be switched directly to each other by rotation of the detent plate without via any other of the shift ranges that is other than the parking range and the forward running range. Therefore, even when the detent plate cannot be rotated, for example, due to failure of the electric source, during the switching transition between the parking range and the forward running range, it is possible to prevent the unintended one of the shift ranges from being established.

In the range switching device according to the second aspect of the invention, the parking lock mechanism can be placed in one of the plurality of operating states thereof which corresponds to a position of the switching member that is to be changed by a reciprocating movement of the first link rod caused by rotation of the detent plate. Further, the valve mechanism can be placed in one of the plurality of operating states thereof which correspond to a position of the spool valve member that is to be changed by a reciprocating movement of the second link rod caused by rotation of the detent plate, such that each of the drive-force transmission cut-off range, the forward running range and the reverse running range can be established depending on selected one of the plurality of operating states of the valve mechanism.

In the range switching device according to the third aspect of the invention, the four engaged portions, each of which cooperates with the engaging member to maintain a corresponding angle value of the rotational angle of the detent plate by which a corresponding one of the parking range, the reverse running range, the drive-force transmission cut-off range and the forward running range is established in the vehicle, are arranged in the circumferential direction at the angular pitch of 90 degrees, such that the first and third engaged portions are located in respective positions diagonal to each other in the circumferential direction, and such that, when each of the first and second link rods is reciprocatingly moved by rotation of the detent plate, the reciprocating movements of the respective first and second link rods are offset in phase from each other by 90 degrees. This arrangement makes it possible to cause the parking lock mechanism to place in either its locking state or unlocking state in a state in which the valve mechanism is placed in its transmission cut-off state. Therefore, when the parking range is to be established in the vehicle, the parking range can be established with the valve mechanism being placed in the transmission cut-off state and which the parking lock mechanism being placed in the locking state.

In the range switching device according to the third aspect of the invention in which the rotational angle of the detent plate is detected by the absolute angle sensor, the shift ranges can be reliably switched between each other based on the rotational angle of the detent plate detected by the absolute angle sensor. Further, since the rotational angle of the detent plate is detected by the absolute angle sensor, the detection of the rotational angle of the detent plate can be made even when the detent plate is rotated by one rotation or more.

DETAILED DESCRIPTION OF PREFERRED EMBODIMENTS

Figure 1:
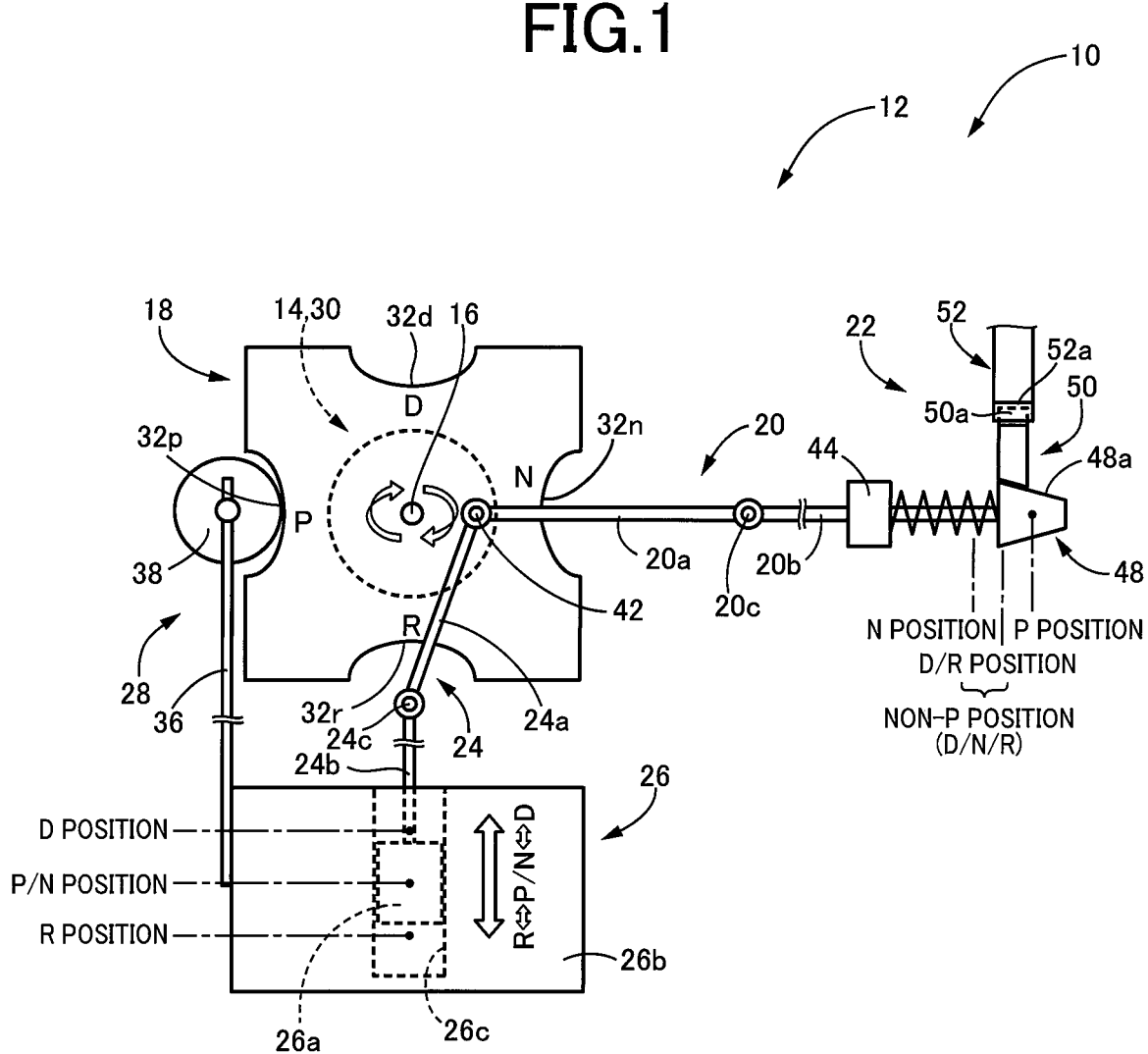
FIG. 1 is a schematic view of a vehicle range switching device constructed according to a first embodiment of the present invention, showing an operating state in which P range as one of shift ranges is established.

Hereinafter, preferred embodiments of the invention will be described in detail with reference to the accompanying drawings. The figures of the drawings are simplified or deformed as needed, and each portion is not necessarily precisely depicted in terms of dimension ratio, shape, etc.

First Embodiment

FIGS. 1-4 are schematic views of a range switching device 12 constructed according to a first embodiment, wherein each of the views shows the range switching device 12 in a device installed state in which the device 12 is installed in a vehicle 10, as seen from a lateral side of the vehicle 10. In each of FIGS. 1-4, an upward direction in the drawing sheet corresponds to an upward direction of the device 12 in the device installed state, and a downward direction in the drawing sheet corresponds to a downward direction of the device 12 in the device installed state. It is noted that the device installed state is a state in which the device 12 is installed in the vehicle 10 and the vehicle 10 is on a flat horizontal road surface.

In the range switching device 12, a shift shaft 16 and a detent plate 18 are rotated integrally with each other about a rotational axis, such that a rotational angle θ of the shift shaft 16 and the detent plate 18 becomes an angle value that is dependent on a selected one of a plurality of shift ranges which is selected by a manual operation made by an operator of the vehicle 10 whereby the selected one of the shift ranges is established in the vehicle 10. The range switching device 12 is configured to switch between the plurality of shift ranges consisting of: P range (parking range) that is a vehicle parking range in which the vehicle 10 is stopped; R range (reverse range) that is a reverse running range in which the vehicle 10 is enabled to run in a reverse direction; N (neutral range) that is a drive-force transmission cut-off range in which transmission of a drive force is cut off; and D range (drive range) in which the vehicle 10 is enabled to run in a forward direction. That is, the range switching device 12 is configured to establish one of the above-described shift ranges, which is dependent on the rotational angle θ of the shift shaft 16 and the detent plate 18. The P range, the R range, the N range and the D range correspond to "parking range", "reverse running range", "drive-force transmission cut-off range" and "forward running range", respectively, which are recited in the appended claims.

Figure 2:
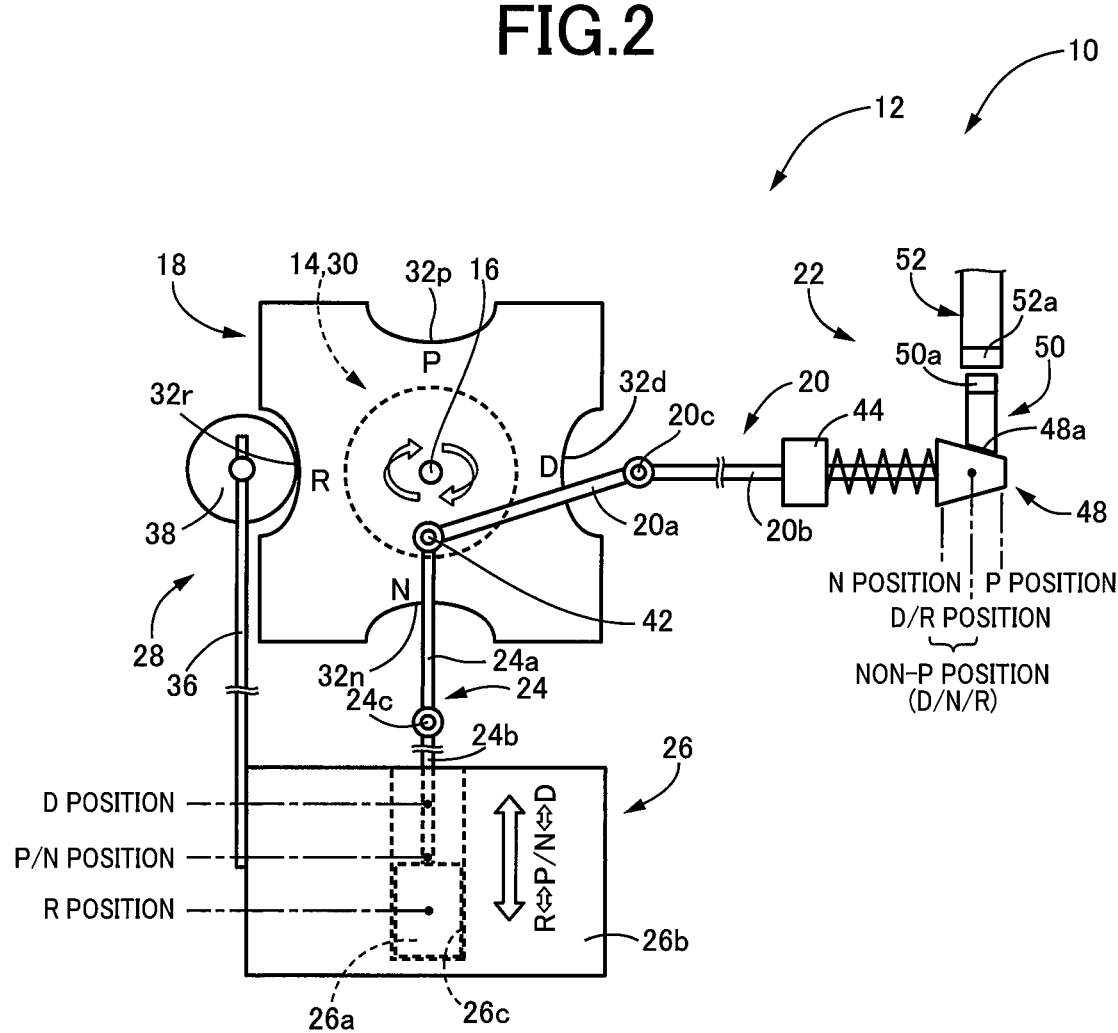
FIG. 2 is a schematic view of the vehicle range switching device constructed according to the first embodiment of the present invention, showing an operating state in which R range as one of the shift ranges is established.
Figure 3:
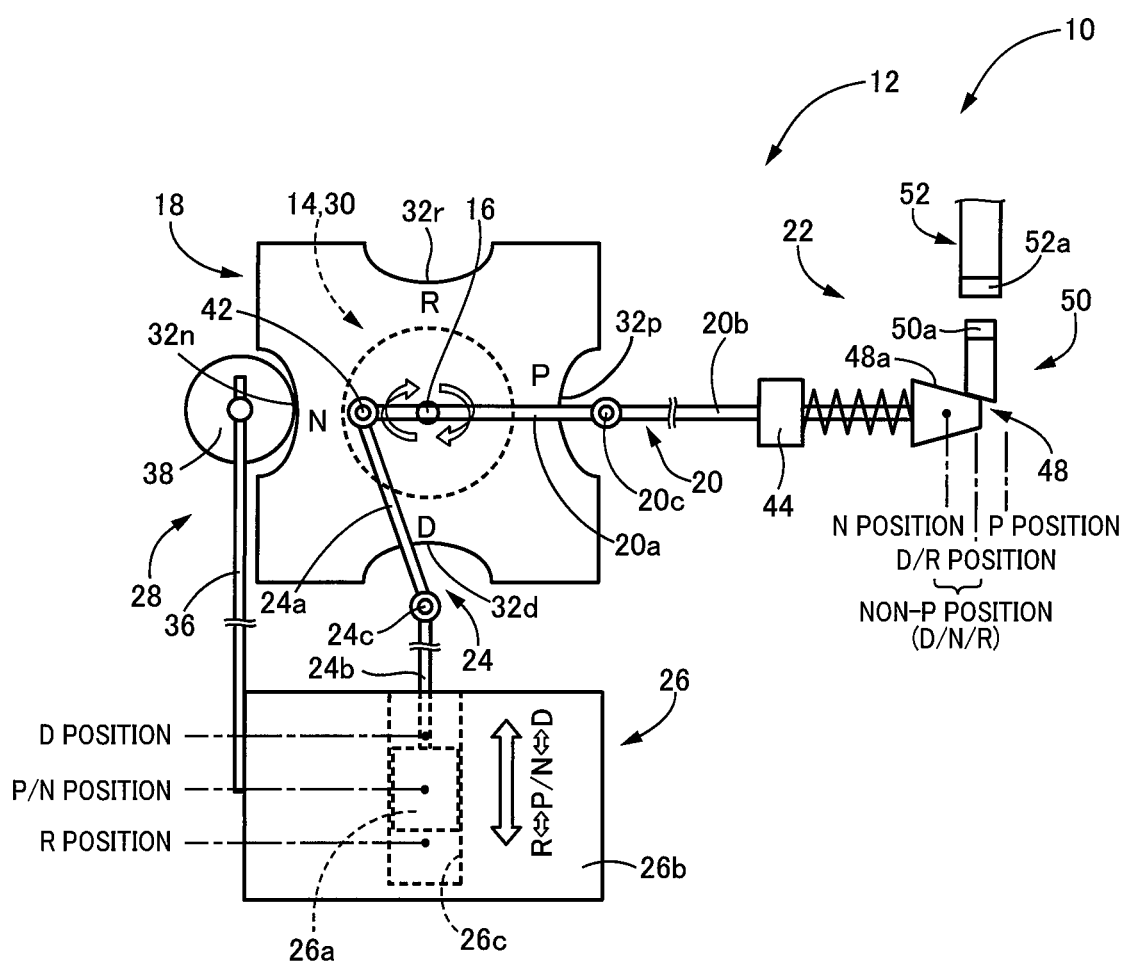
FIG. 3 is a schematic view of the vehicle range switching device constructed according to the first embodiment of the present invention, showing an operating state in which N range as one of the shift ranges is established.
Figure 4:
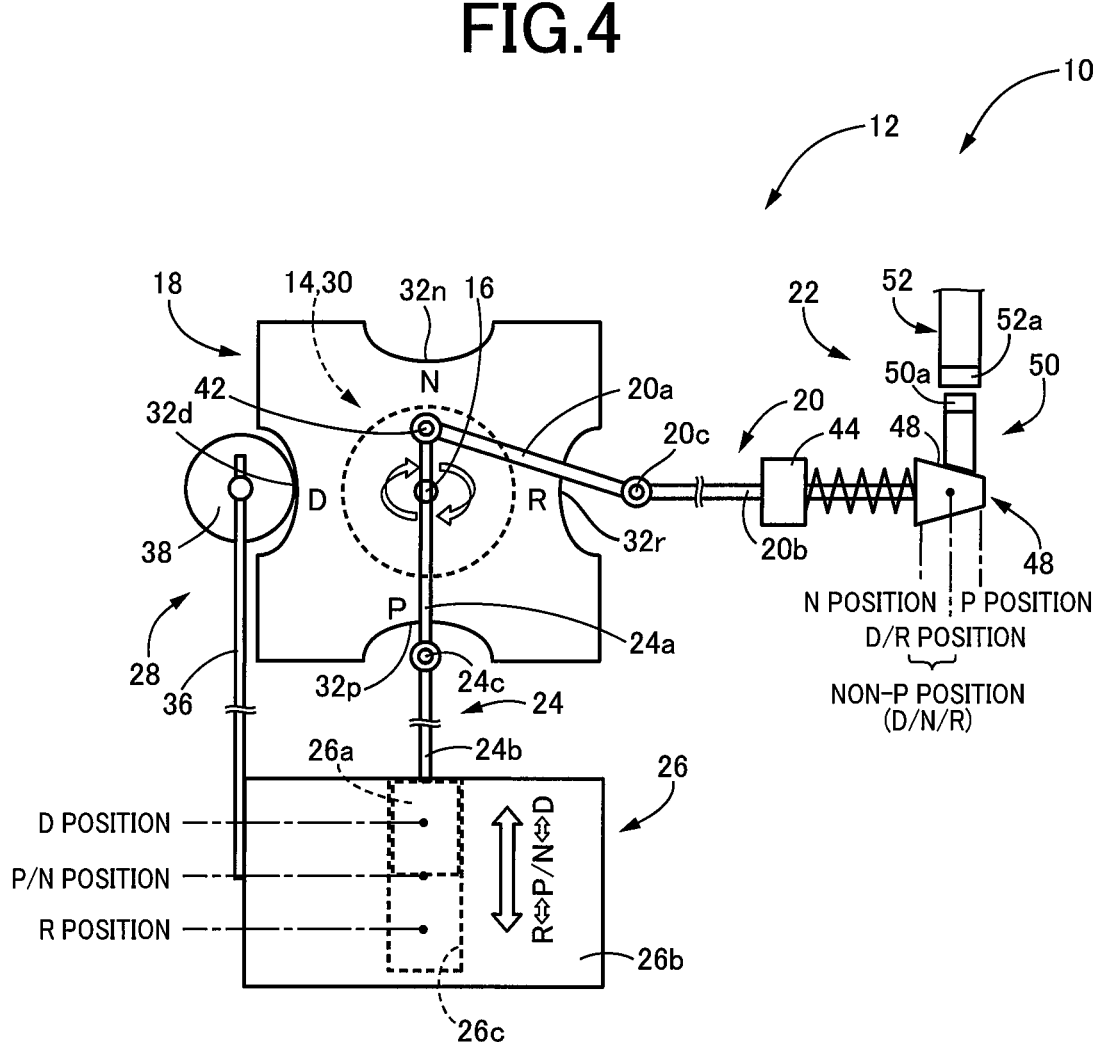
FIG. 4 is a schematic view of the vehicle range switching device constructed according to the first embodiment of the present invention, showing an operating state in which D range as one of the shift ranges is established.

FIG. 1 shows a reference operating state of the range switching device 12, which is an operating state of the range switching device 12 by which the P range is established in the vehicle 10. FIG. 2 shows another operating state of the range switching device 12 by which the R range is established in the vehicle 10. FIG. 3 shows still another operating state of the range switching device 12 by which the N range is established in the vehicle 10. FIG. 4 shows still another operating state of the range switching device 12 by which the D range is established in the vehicle 10. In the operating state shown in FIG. 2, the rotational angle θ (of the shift shaft 16 and the detent plate 18) from the reference operating state shown in FIG. 1 is 90 degrees. In the operating state shown in FIG. 3, the rotational angle θ from the reference operating state shown in FIG. 1 is 180 degrees. In the operating state shown in FIG. 4, the rotational angle θ from the reference operating state shown in FIG. 1 is 270 degrees.

Figure 5:
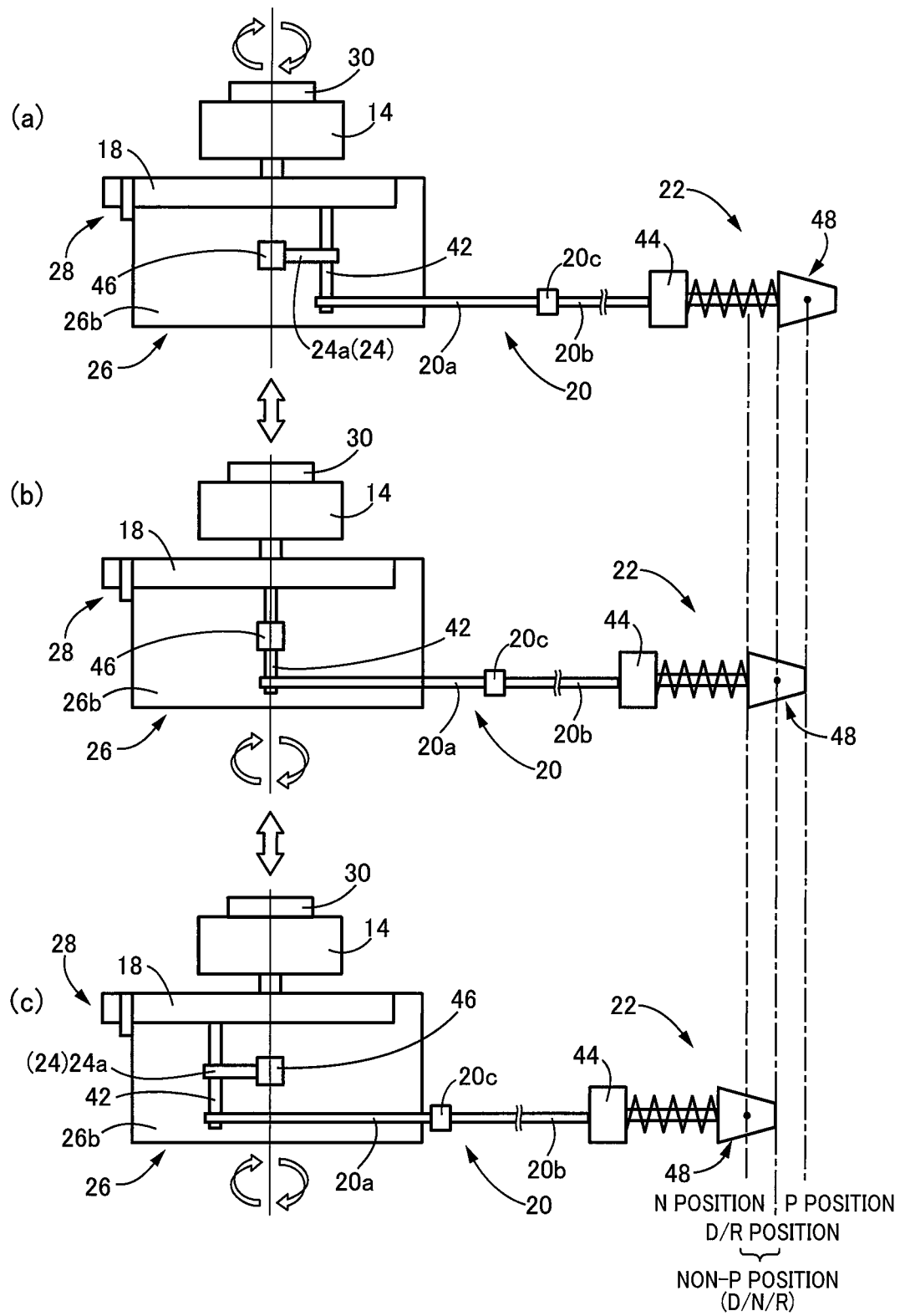
FIG. 5 a set of views of the vehicle range switching device shown in FIGS. 1-4, when being installed in a vehicle, showing respective operating states, wherein the views are as seen from an upper side of the range switching device.

FIG. 5 a set of views of the range switching device 12, as seen from an upper side of the range switching device 12. Specifically, in FIG. 5, the view (a) shows the above-described reference operating state, i.e., the operating state (shown in FIG. 1) of the range switching device 12 by which the P range is established in the vehicle 10. The view (b) shows the operating state (shown in FIG. 2) of the range switching device 12 by which the R range is established in the vehicle 10 and also the operating state (shown in FIG. 4) of the range switching device 12 by which the D range is established in the vehicle 10. The view (c) shows the operating state (shown in FIG. 3) of the range switching device 12 by which the N range is established in the vehicle 10.

The range switching device 12 includes: an electric motor 14; the above-described shift shaft 16 that is to be rotated by the electric motor 14; the above-described detent plate 18 that is connected to the shift shaft 16 so as to rotated integrally with the shift shaft 16 by the electric motor 14; a first link rod 20 that is connected at its longitudinal end portion to the detent plate 18, a parking lock mechanism 22 that is connected at another longitudinal end portion of the first link rod 20; a second link rod 24 that is connected at its longitudinal end portion to the detent plate 18; a manual valve mechanism 26 that is connected to another longitudinal end portion of the second link rod 24; and a detent positioning mechanism 28 that is configured to maintain the rotational angle θ of the detent plate 18. Each of the first and second link rods 20, 24 is connected to a connecting portion 42 of the detent plate 18 which is located in a position offset from the rotational axis about which the shift shaft 16 and the detent plate 18 are to be rotated, such that each of the first and second link rods 20, 24 is to be reciprocatingly moved by rotation of the detent plate 18. It is noted that the detent positioning mechanism 28 may be referred also to as "detent rotational-angle maintaining mechanism".

The electric motor 14 is configured, when an operation is made by the operator of the vehicle 10 to switch a currently selected one of the shift ranges to another one of the shift ranges, to rotate the shift shaft 16 and the detent plate 18 such that the rotational angle θ of the shift shaft 16 and the detent plate 18 becomes a target angle value corresponding to the another one of the shift ranges which is selected by the operation. Angle values of the rotational angle θ of the shift shaft 16 and the detent plate 18 corresponding to the respective shift ranges are predetermined. The electric motor 14 is to be controlled by an electronic control apparatus (not shown), so as to rotate the shift shaft 16 and the detent plate 18 in accordance with a drive signal (command signal) supplied from the electronic control apparatus such that the rotational angle θ becomes an angle vale corresponding to one of the shift ranges which is selected to be established in the vehicle 10.

The range switching device 12 includes an absolute angle sensor 30 (e.g., absolute rotary encoder) configured to detect a rotational angle of the electric motor 14, i.e., the rotational angle θ of the shift shaft 16 and the detent plate 18. The electric motor 14 is controlled based on the rotational angle θ detected by the absolute angle sensor 30, such that the rotational angle θ becomes an angle value of the rotational angle θ corresponding to one of the shift ranges which is selected to be established in the vehicle 10. It is noted that, in FIGS. 1-4, the electric motor 14 is represented by broken line since the electric motor 14 is located behind the detent plate 18 in the views of FIGS. 1-4.

The detent plate 18 is connected to the electric motor 14 through the shift shaft 16. Thus, the detent plate 18 is rotatable in opposite directions by the electric motor 14 through the shift shaft 16.

The detent plate 18 is constituted by a square-shaped plate member having a predetermined thickness. The detent plate 18 has four recessed portions 32p, 32r, 32n, 32d (hereinafter simply referred to as "recessed portions 32" unless they are to be distinguished from each other) which are provided in four sides located in an outer peripheral end portion of the detent plate 18, and which are arranged in a circumferential direction about the rotational axis. Each of the four recessed portions 32p, 32r, 32n, 32d corresponds to a corresponding one of the shift ranges, and serves to maintain a corresponding angle value of the rotational angle θ of the detent plate 18 for thereby maintaining the corresponding one of the shift ranges that is established by the corresponding angle value of the rotational angle θ of the detent plate 18. It is noted that the recessed portions 32p, 32r, 32n, 32d correspond to "engaged portions" recited in the appended claims.

FIG. 1 shows the reference operating state of the range switching device 12, which is an operating state of the range switching device 12 by which the P range is established in the vehicle 10. In this reference operating state by which the P range is established, the recessed portion 32p, which corresponds to the P range, is positioned in a reference position in the circumferential direction about the rotational axis, and a roller 38 of the detent positioning mechanism 28, which is located in the reference position, is pressed against the recessed portion 32p, for thereby maintaining an angle value (0 degree) of the rotational angle θ of the detent plate 18 that corresponds to the P range.

FIG. 2 shows the operating state of the range switching device 12 by which the R range is established in the vehicle 10. In this operating state of FIG. 2 by which the R range is established, the recessed portion 32r, which corresponds to the R range, is positioned in the reference position in the circumferential direction, and the roller 38 is pressed against the recessed portion 32r, for thereby maintaining an angle value (90 degrees) of the rotational angle θ of the detent plate 18 that corresponds to the R range.

FIG. 3 shows the operating state of the range switching device 12 by which the N range is established in the vehicle 10. In this operating state of FIG. 3 by which the N range is established, the recessed portion 32n, which corresponds to the N range, is positioned in the reference position in the circumferential direction, and the roller 38 is pressed against the recessed portion 32n, for thereby maintaining an angle value (180 degrees) of the rotational angle θ of the detent plate 18 that corresponds to the N range.

FIG. 4 shows the operating state of the range switching device 12 by which the D range is established in the vehicle 10. In this operating state of FIG. 4 by which the D range is established, the recessed portion 32*d*, which corresponds to the D range, is positioned in the reference position in the circumferential direction, and the roller 38 is pressed against the recessed portion 32*d*, for thereby maintaining an angle value (270 degrees) of the rotational angle θ of the detent plate 18 that corresponds to the D range.

The detent positioning mechanism 28 includes a detent spring 36 constituted by an elongated plate member, and the above-described roller 38 provided in a distal end portions of the detent spring 36. The roller 38 provided in the distal end portion of the detent spring 36 is freely-rotatable about its rotational axis. The detent spring 36 is fixed at its proximal end portion (i.e., at its longitudinal end portion remote from the roller 38) to a valve body 26*b* of the manual valve mechanism 26. The detent spring 36 constantly forces or biases the roller 38 to be pressed against the outer peripheral end portion of the detent plate 18. It is noted that the roller 38 corresponds to "engaging member" and "pressing member" recited in the appended claims.

With the roller 38 being pressed against the outer peripheral end portion of the detent plate 18, the rotational angle θ of the detent plate 18 is kept at an angle value corresponding to the shift range established in the vehicle 10, as described above. For example, when the P range is established, the roller 38 is engaged with the recessed portion 32*p*, namely, the roller 38 is pressed against the recessed portion 32*p*, whereby the rotational angle θ of the detent plate 18 is kept at an angle value (0 degree) corresponding to the P range, namely, whereby the angle value corresponding to the P range of the detent plate 18 is maintained. When any one of the shift ranges is to be switched to another one of the shift ranges, the electric motor 14 outputs a rotational torque acting against a biasing force (i.e., maintaining force) applied to the roller 38 from the detent spring 36, and the outputted rotational torque is applied to the detent plate 18 whereby the detent plate 18 is rotated. In this instance, the roller 38 is moved relative to the recessed portions 32, along the outer peripheral end portion of the detent plate 18, while being held in contact with the outer peripheral end portion of the detent plate 18. Then, when the detent plate 18 has been rotated to an angle value of the rotational angle θ corresponding to a selected one of the shift ranges, the rotation of the detent plate 18 is stopped and the roller 38 is pressed against one of the recessed portions 32 which corresponds to the selected one of the shift ranges and which has been positioned in the reference position in the circumferential direction.

Since the recessed portions 32 are provided in the outer peripheral end portion of the detent plate 18 and are arranged in the circumferential direction about the rotational axis at a predetermined angular pitch (90 degrees), the plurality of shift ranges (P range, R range, N range, D range) are sequentially established as the detent plate 18 is rotated. That is, as the detent plate 18 is rotated from a state in which one of the shift ranges is established, the others of the shift ranges are sequentially established, and when the detent plate 18 has been rotated by one rotation (360 degrees) from the state, the same one of the shift ranges is returned to be established.

The first link rod 20 is an intermediate member that is configured to covert the rotation of the detent plate 18 into a reciprocating movement, so as to cause the parking lock mechanism 22 to be operated together with the rotation of the detent plate 18. The first link rod 20 is reciprocatingly movable generally in a direction in which the first link rod 20 is elongated, together with rotation of the detent plate 18. That is, the first link rod 20 is configured to convert the rotation of the detent plate 18 into the reciprocating movement. The first link rod 20 includes: a first member 20*a* connected to the detent plate 18; a second member 20*b* connected to a tapered member 48 of the parking lock mechanism 22; and a joint portion 20*c* connecting the first and second members 20*a*, 20*b*.

The first member 20*a* is connected at its longitudinal end portion to the above-described connecting portion 42 (that is located in the position offset from the rotational axis about which the detent plate 18 is to be rotated) of the detent plate 18, such that the first member 20*a* is pivotable about the joint portion 20*c* by rotation of the detent plate 18. The connecting portion 42 is moved, together with rotation of the detent plate 18, along a circle whose center lies on the above-described rotational axis, i.e., an axis of the shift shaft 16. The second member 20*b* is held by a holding member 44 such that the second member 20*b* is linearly and reciprocatingly movable together with the joint portion 20*c* along a straight line passing through the rotational axis in a longitudinal direction of the second member 20*b*. The joint portion 20*c* connects the first and second members 20*a*, 20*b* while allowing bending or inclination of the first member 20*a* relative to the second member 20*b*. Thus, when the detent plate 18 is rotated, the second member 20*b* of the first link rod 20 is linearly and reciprocatingly moved and the first member 20*a* of the first link rod 20 is pivoted about the joint portion 20*c*. Further, when the detent plate 18 is rotated, the tapered member 48, which is connected to the second member 20*b*, is also linearly and reciprocatingly moved together with the second member 20*b* along the straight line passing through the rotational axis in the longitudinal direction of the second member 20*b*.

For example, in the reference operating state of the range switching device 12 shown in FIG. 1 and the view (a) of FIG. 5, the connecting portion 42, which is to be moved along the above-described circle, is positioned in its rightmost position as seen in the drawing sheets, and the second member 20*b* of the first link rod 20 is positioned in its rightmost position as seen in the drawing sheets. When the connecting portion 42 is moved leftward as seen in the drawing sheets by rotation of the detent plate 18 from the reference operating state, the second member 20*b* is also moved leftward as seen in the drawing sheets. Then, in the operating state of the range switching device 12 shown in FIG. 3 and the view (c) of FIG. 5, the connecting portion 42 is positioned in its leftmost position as seen in the drawing sheets, and the second member 20*b* of the first link rod 20 is positioned in its leftmost position as seen in the drawing sheets. When the connecting portion 42 is moved rightward as seen in the drawing sheets by further rotation of the detent plate 18, the second member 20*b* is also moved rightward as seen in the drawing sheets. Thus, the second member 20*b* of the first link rod 20 is reciprocatingly moved by rotation of the detent plate 18.

The second link rod 24 is an intermediate member that is configured to covert the rotation of the detent plate 18 into the reciprocating movement, so as to cause the manual valve mechanism 26 to be operated together with the rotation of the detent plate 18. The second link rod 24 is reciprocatingly movable generally in a direction in which the second link rod 24 is elongated, together with rotation of the detent plate 18. That is, the second link rod 24 is configured to convert the rotation of the detent plate 18 into the reciprocating movement. The second link rod 24 includes: a first member 24a connected to the detent plate 18; a second member 24b connected to a spool valve member 26a of the manual valve mechanism 26; and a Joint portion 24c connecting the first and second members 24a, 24b.

The first member 24a is connected at its longitudinal end portion to the connecting portion 42 (which is located in the position offset from the rotational axis) of the detent plate 18, such that the first member 24a is pivotable about the joint portion 24c. The second member 24b is connected to the spool valve member 26a of the manual valve mechanism 26, which is slidably received in a cylinder bore 26c provided in the valve body 26b. The second member 24b is held by the spool valve member 26a to which the second member 24b is connected, such that the second member 24b is linearly and reciprocatingly movable together with the joint portion 24c along a straight line passing through the rotational axis in a longitudinal direction of the second member 24b. The joint portion 24c connects the first and second members 24a, 24b while allowing bending or inclination of the first member 24a relative to the second member 24b. Thus, when the detent plate 18 is rotated, the second member 24b of the second link rod 24 is linearly and reciprocatingly moved and the first member 24a of the second link rod 24 is pivoted about the joint portion 24c. Further, when the detent plate 18 is rotated, the spool valve member 26a, which is connected to the second member 24b, is also is also linearly and reciprocatingly moved, together with the second member 24b, in the cylinder bore 26c, along the straight line passing through the rotational axis in the longitudinal direction of the second member 24b.

For example, in the operating state of the range switching device 12 shown in FIG. 4, the connecting portion 42, which is to be moved along the above-described circle, is positioned in its uppermost position as seen in the drawing sheet, and the second member 24b of the second link rod 24 is positioned in its uppermost position as seen in the drawing sheet. When the connecting portion 42 is moved downward as seen in the drawing sheets by rotation of the detent plate 18 from the operating state shown in FIG. 4, the second member 24b is also moved downward as seen in the drawing sheets. Then, in the operating state of the range switching device 12 shown in FIG. 2, the connecting portion 42 is positioned in its lowermost position as seen in the drawing sheets, and the second member 24b of the second link rod 24 is positioned in its lowermost position as seen in the drawing sheets. When the connecting portion 42 is moved upward as seen in the drawing sheet by further rotation of the detent plate 18, the second member 24b is also moved upward as seen in the drawing sheet. Thus, the second member 24b of the second link rod 24 is reciprocatingly moved by rotation of the detent plate 18.

The parking lock mechanism 22 is to be operated when an operation is made by the operator to switch the currently selected shift range to the P range, so as to mechanically stop rotations of drive wheels (not shown) of the vehicle 10 for thereby stopping the vehicle 10. The parking lock mechanism 22 includes the tapered member 48 connected to a longitudinal end portion of the second member 20b of the first link rod 20, a parking pawl 50 which is held in contact with the tapered member 48 and which is to be moved or pivoted depending on a position of the tapered member 48, and a parking gear 52 having an outer peripheral teeth 52a that is to mesh with a meshing teeth 50a provided in the parking pawl 50. It is noted that the tapered member 48 corresponds to "switching member" recited in the appended claims, and that the parking pawl 50 correspond to "another member (of the parking lock mechanism)" recited in the appended claims.

The tapered member 48 has a diameter that is reduced in a direction away from the holding member 44, i.e., in rightward direction as seen in the drawing sheets, and is to be reciprocatingly moved together with the reciprocating movement of the second member 20b and the joint portion 20c of the first link rod 20. The tapered member 48 is to be positioned in one of its operating positions which correspond to a selected one of the shift ranges selected by the operator. The parking pawl 50 is held in contact with a tapered surface 48a of the tapered member 48, and is moved or pivoted depending on the selected one of the operating positions of the tapered member 48.

For example, when an operation has been made by the operator to switch the previously selected shift range to the P range, the tapered member 48 is moved to be positioned in P position (that is one of the operating positions of the tapered member 48) as shown in FIG. 1 and the view (a) of FIG. 5. In this instance, as shown in FIG. 1, the parking pawl 50 is in contact with a large diameter portion of the tapered surface 48a of the tapered member 48 whereby the parking pawl 50 is moved or pivoted upwardly. With the upward movement or pivot movement of the parking pawl 50, the teeth 50a of the parking pawl 50 comes to mesh with the outer peripheral teeth 52a of the parking gear 52 whereby rotation of the parking gear 52 is stopped. The parking gear 52 is associated with the drive wheels (not shown) of the vehicle 10, so that the rotations of the drive wheels are stopped with stop of the rotation of the parking gear 52. Thus, the P range is established in the vehicle 10 whereby the vehicle 10 is stopped.

Further, when an operation has been made by the operator to switch the previously selected shift range to the R range, the tapered member 48 is moved to be positioned in D/R position (that is one of the operating positions of the tapered member 48) as shown in FIG. 2 and the view (b) of FIG. 5. In this instance, as shown in FIG. 2, the parking pawl 50 is in contact with an axially intermediate portion of the tapered surface 48a of the tapered member 48 which has a diameter smaller than the above-described large diameter portion of the tapered surface 48a of the tapered member 48 whereby the parking pawl 50 is moved or pivoted to a position located on a lower side of a position shown in FIG. 1. With the downward movement or pivot movement of the parking pawl 50, the meshing of the meshing teeth 50a of the parking pawl 50 with the outer peripheral teeth 52a of the parking gear 52 is released whereby the rotation of the parking gear 52 becomes allowed.

Further, when an operation has been made by the operator to switch the previously selected shift range to the N range, the tapered member 48 is moved to be positioned in N position (that is one of the operating positions of the tapered member 48) as shown in FIG. 3 and the view (c) of FIG. 5. In this instance, as shown in FIG. 3, the parking pawl 50 is in contact with a small diameter portion of the tapered surface 48a of the tapered member 48 whereby the parking pawl 50 is moved or pivoted further downwardly from a position shown in FIG. 2. With the further downward movement or pivot movement of the parking pawl 50, the meshing teeth 50a of the parking pawl 50 is further separated from the outer peripheral teeth 52a of the parking gear 52 is released so that the rotation of the parking gear 52 remains allowed.

Further, when an operation has been made by the operator to switch the previously selected shift range to the D range, the tapered member 48 is moved to be positioned in the D/R position as shown in FIG. 4 and the view (b) of FIG. 5. In this instance, as shown in FIG. 4, the parking pawl 50 is in contact with the above-described axially intermediate portion of the tapered surface 48a of the tapered member 48 whereby the parking pawl 50 is moved or pivoted to the position located on the lower side of the position shown in FIG. 1. With the movement or pivot movement of the parking pawl 50 to the position shown in FIG. 4, the meshing of the meshing teeth 50a of the parking pawl 50 with the outer peripheral teeth 52a of the parking gear 52 is released whereby the rotation of the parking gear 52 is allowed.

Thus, the tapered member 48 is to be positioned in a selected one of the three operating positions consisting of the P position, D/R position and N position, which is selected based on the operation made by the operation to switch among the four shift ranges. It is noted that each of the D/R position and the N position corresponds to non-P position by which non-P range (R range, N range, D range) that is other than the P range is established in the vehicle 10, because the meshing of the meshing teeth 50a of the parking pawl 50 with the outer peripheral teeth 52a of the parking gear 52 is released when the tapered member 48 is positioned in either the N position or the D/R position. It is also noted that the D/R position is located between the P position and the N position in a direction in which the tapered member 48 is to be reciprocatingly moved. It is also noted that the valve body 26b corresponds to "another member (of the valve mechanism 26)" recited in the appended claims.

The manual valve mechanism 26 includes the spool valve member 26a connected to the second link rod 24, and the valve body 26b having the cylinder bore 26c in which the spool valve member 26a is slidably received. The manual valve mechanism 26 is configured to switch among the shift ranges established in the vehicle 10, with the spool valve member 26a being positioned in one of operating positions.

The spool valve member 26a is to be positioned in one of the operating positions consisting of P/N position in which the transmission of the drive force is cut off in the vehicle 10, D position in which the vehicle 10 is enabled to run in the forward direction, and R position in which the vehicle 10 is enabled to run in the reverse direction. When the spool valve member 26a is positioned in the P/N position that is an intermediate position in the cylinder bore 26c, as shown in FIG. 1 and FIG. 3, the P range or the N range is established whereby the transmission of the drive force is cut off in the vehicle 10. The P/N position of the spool valve member 26a is common to the P range and the N range established in the vehicle 10. That is, either when the P range is established in the vehicle 10 or when the N range is established in the vehicle 10, the spool valve member 26a is positioned in the P/N position. This is because, when the P range is established in the vehicle 10, the rotations of the drive wheels are mechanically stopped by the P/N position, and the transmission of the drive force is cut off as when the N range is established in the vehicle 10. When the spool valve member 26a is positioned in the R position that is a bottom-side position in the cylinder bore 26c, as shown in FIG. 2, the R range is established whereby the vehicle 10 is enabled to run in the reverse direction. When the spool valve member 26a is positioned in the D position that is an opening-side position in the cylinder bore 26c, as shown in FIG. 4, the D range is established whereby the vehicle 10 is enabled to run in the forward direction. It is noted that the P/N position is located between the D position and the R position in a direction in which the spool valve member 26a is to be reciprocatingly moved.

As described above, the detent plate 18 has the four recessed portions 32 which are provided in its outer peripheral end portion and which are arranged in the circumferential direction at a constant angular pitch of 90 degrees, wherein the four recessed portions 32 consist of the recessed portion 32p, the recessed portion 32r, the recessed portion 32n and the recessed portion 32d. Each of the recessed portion 32p, the recessed portion 32r, the recessed portion 32n and the recessed portion 32d serves as the engaged portion that cooperates with the roller 38 as the engaging member to keep the rotational angle θ of the detent plate 18 in a corresponding one of the angle values, when being positioned in the reference position in the circumferential direction, namely, when the rotational angle θ of the detent plate 18 becomes the corresponding one of the angle values. Thus, each time when the detent plate 18 is rotated by 90 degrees from a state in which any one of the shift ranges is established in the vehicle 10 with a corresponding one of the recessed portions 32 being positioned in the reference position in the circumferential direction, another one of the shift ranges is established in the vehicle 10, wherein the other one of the shift ranges corresponds to one of the recessed portions 32 that is adjacent to the corresponding one of the recessed portions 32 in the circumferential direction.

Specifically described, as the detent plate 18 is rotated in clockwise direction (as seen in FIGS. 1-4) from the above-described reference operating state of the range switching device 12 in which the recessed portion 32p is positioned in the reference position in the circumferential direction, the recessed portion 32r, the recessed portion 32n and recessed portion 32d are sequentially positioned in the reference position in this order of description whereby the roller 38 is brought into contact with the recessed portion 32r, the recessed portion 32n and recessed portion 32d in this order of description. Thus, when the detent plate 18 is clockwise rotated from the reference operating state with the P range being established in the vehicle 10, the R range, the N range and the D range are sequentially established in this order of description. When the detent plate 18 is rotated in counter-clockwise direction from the reference operating state with the P range being established in the vehicle 10, the D range, the N range and the R range are sequentially established in this order of description. When the detent plate 18 has been rotated by 360 degrees, i.e., by one rotation, from the reference operating state, the P range is returned to be established. In the detent plate 18, the recessed portion 32p corresponding to the P range and the recessed portion 32d corresponding to the D range are located in respective positions adjacent to each other in the circumferential direction, and the recessed portion 32p corresponding to the P range and the recessed portion 32n corresponding to the N range are located in respective positions diagonal to each other in the circumferential direction. It is noted that the recessed portions 32p, 32d, 32n correspond to "first engaged portion", "second engaged portion", "third engaged portion", respectively, which are recited in the appended claims.

Further, in the range switching device 12, the parking lock mechanism 22 and the manual valve mechanism 26 are to be switched among operating states, independently of each other. The parking lock mechanism 22 is to be switched among the operating states depending on a selected one of the three operating positions of the tapered member 48 connected to the first link rod 20 (second member 20b) that is to be reciprocatingly moved by rotation of the detent plate 18, namely, depending on one of the three operating positions of the tapered member 48 which corresponds to the rotational angle θ of the detent plate 18. For example, in the reference operating state of the range switching device 12 as shown in FIG. 1 and the view (a) of FIG. 5 in which the rotational angle θ of the detent plate 18 is 0 degree for establishing the P range in the vehicle 10, the tapered member 48 is positioned in the P position whereby the parking lock mechanism 22 is placed in a locking state (as one of the operating states) in which the rotation of the parking gear 52 is inhibited. Further, in each of the operating states of the range switching device 12 as shown in FIGS. 2-4 and the views (b), (c) of FIG. 5 in which the rotational angle θ of the detent plate 18 is 90 degrees, 180 degrees or 270 degrees for establishing the R range, the N range or the D range in the vehicle 10, the tapered member 48 is positioned in the N position or the D/R position whereby the parking lock mechanism 22 is placed in an unlocking state (as another one of the operating states) in which the rotation of the parking gear 52 is allowed. It is noted that the locking state of the parking lock mechanism 22 may be referred also to as "activating state" of the parking lock mechanism 22 and that the unlocking state of the parking lock mechanism 22 may be referred also to as "non-activating state" of the parking lock mechanism 22.

The manual valve mechanism 26 is to be switched among the operating states depending on a selected one of the three operating positions of the spool valve member 26a connected to the second link rod 24 (second member 24b) that is to be reciprocatingly moved by rotation of the detent plate 18, namely, depending on one of the three operating positions of the spool valve member 26a which corresponds to the rotational angle θ of the detent plate 18. For example, in each of the operating states of the range switching device 12 as shown in FIGS. 1 and 3 in which the rotational angle θ of the detent plate 18 is 0 degree or 180 degrees for establishing the P range or N range in the vehicle 10, the spool valve member 26a is positioned in the P/N position whereby the manual valve mechanism 26 is placed in a transmission cut-off state (as one of the operating states) in which the transmission of the drive force is cut off in the vehicle 10. In the operating state of the range switching device 12 as shown in FIG. 2 in which the rotational angle θ of the detent plate 18 is 90 degrees for establishing the R range in the vehicle 10, the spool valve member 26a is positioned in the R position whereby the manual valve mechanism 26 is placed in a reverse driving state (as one of the operating states) in which the vehicle 10 is enabled to run in the reverse direction. In the operating state of the range switching device 12 as shown in FIG. 4 in which the rotational angle θ of the detent plate 18 is 270 degrees, for establishing the D range in the vehicle 10, the spool valve member 26a is positioned in the D position whereby the manual valve mechanism 26 is placed in a forward driving state (as one of the operating states) in which the vehicle 10 is enabled to run in the forward direction.

Further, the range switching device 12 is constructed such that the direction of the reciprocating movement of the second member 20b of the first link rod 20 and the direction of the reciprocating movement of the second member 24b of the second link rod 24 are orthogonal to each other. Specifically, the second member 20b and the joint portion 20c of the first link rod 20 and the tapered member 48 of the parking lock mechanism 22 are to be linearly and reciprocatingly moved along a first straight line, while the second member 24b and the joint portion 24c of the second link rod 24 and the spool valve member 26a of the manual valve mechanism 26 are to be linearly and reciprocatingly moved along a second straight line. The first straight line is a line passing through a bottom center of the recessed portion 32p and a bottom center of the recessed portion 32n in the reference operating state shown in FIG. 1, namely, a line passing through the above-described rotational axis of the detent plate 18 and the above-described rotational axis of the roller 38. The second straight line is a line passing through a bottom center of the recessed portion 32d and a bottom center of the recessed portion 32r in the reference operating state shown in FIG. 1, namely, a line passing through the above-described rotational axis of the detent plate 18 and orthogonal to the above-described first straight line.

Owing to the above-described construction of the range switching device 12, when an operation is made by the operator to establish the P range in the vehicle 10, the tapered member 48 of the parking lock mechanism 22 can be positioned in the P position while the spool valve member 26a of the manual valve mechanism 26 can be positioned in the P/N position. Further, when an operation is made by the operator to establish the R range in the vehicle 10, the tapered member 48 of the parking lock mechanism 22 can be positioned in the D/R position while the spool valve member 26a of the manual valve mechanism 26 can be positioned in the R position. Still further, when an operation is made by the operator to establish the N range in the vehicle 10, the tapered member 48 of the parking lock mechanism 22 can be positioned in the N position while the spool valve member 26a of the manual valve mechanism 26 can be positioned in the P/N position. Moreover, when an operation is made by the operator to establish the D range in the vehicle 10, the tapered member 48 of the parking lock mechanism 22 can be positioned in the D/R position while the spool valve member 26a of the manual valve mechanism 26 can be positioned in the D position. It is noted that the N position, D/R position and P position of the tapered member 48 is a position of the tapered member 48 as the switching member relative to the parking pawl 50 as the another member of the parking lock mechanism 22 in the direction of the first straight line in which the second member 20b and the joint portion 20c of the first link rod 20 and the tapered member 48 of the parking lock mechanism 22 are to be linearly and reciprocatingly moved, and that the D position, P/N position and R position of the spool valve member 26a is a position of the spool valve member 26a relative to the valve body 26b as the another member of the manual valve mechanism 26 in the direction of the second straight line in which the second member 24b and the joint portion 24c of the second link rod 24 and the spool valve member 26a of the manual valve mechanism 26 are to be linearly and reciprocatingly moved.

The direction of the reciprocating movement of the second member 20b of the first link rod 20 and the direction of the reciprocating movement of the second member 24b of the second link rod 24 are orthogonal to each other, as described above, whereby the reciprocating movements of the second members 20b, 24b of the respective first and second link rods 20, 24 are offset in phase (that is dependent on the rotational angle θ of the detent plate 18) from each other by 90 degrees, namely, a timing of inversion of movement direction in the reciprocating movement of the second member 20b of the first link rod 20 and a timing of inversion of movement direction in the reciprocating movement of the second member 24b of the second link rod 24 are deviated from each other by an amount corresponding to one-quarter of a cycle of the reciprocating movements of the second members 20b, 24b of the respective first and second link rods 20, 24. In other words, the phase of the reciprocating movement of the tapered member 48 of the parking lock mechanism 22 and the phase of the reciprocating movement of the spool valve member 26a of the manual valve mechanism 26 are offset from each other by 90 degrees. In connection with this feature, the tapered member 48 and the spool valve member 26a can be positioned in respective positions that are changed by rotation of the detent plate 18.

Figure 6:
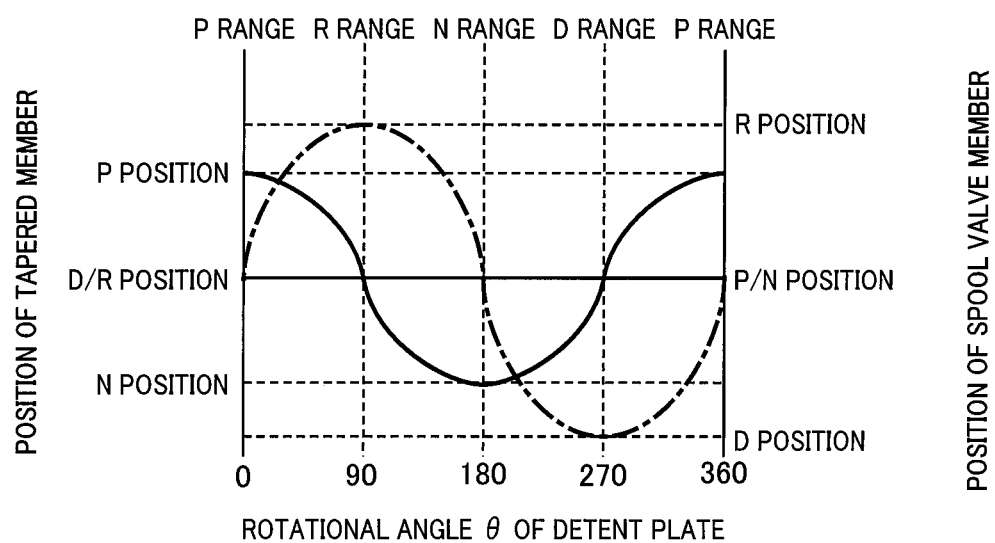
FIG. 6 is a view showing a relationship between a rotational angle of a detent plate and a position of a tapered member and a relationship between the rotational angle of the detent plate and a position of a spool valve member.

FIG. 6 shows the operating positions of the tapered member 48 of the parking lock mechanism 22 and the spool valve member 26a of the manual valve mechanism 26 in each of the angle values of the rotational angle θ of the detent plate 18 that are represented in abscissa of FIG. 6. As shown in FIG. 6, when the rotational angle θ of the detent plate 18 is 0 degree, the range switching device 12 is placed in the reference operating state and the P range as one of the shift ranges is established in the vehicle 10. In FIG. 6, solid line indicates the operating positions of the tapered member 48 while one-dot chain line indicates the operating positions of the spool valve member 26a. For example, as shown in FIG. 6, when the rotational angle θ of the detent plate 18 is 0 degree, the tapered member 48 is positioned in the P position and the spool valve member 26a is positioned in the P/N position. When the rotational angle θ of the detent plate 18 is 90 degrees, the tapered member 48 is positioned in the D/R position and the spool valve member 26a is positioned in the R position. As is understood from also FIG. 6, a distance of the joint portion 20c of the first link rod 20 from the parking pawl 50 as the another member of the parking lock mechanism 22 in the direction of the above-described first straight line is minimized when the rotational angle θ of the detent plate 18 is 0 degree (first angle value), and is maximized when the rotational angle θ of the detent plate 18 is 180 degrees (third angle value), and a distance of the joint portion 24c of the second link rod 24 from the valve body 26b as the another member of the manual valve mechanism 26 in the direction of the above-described second straight line is minimized when the rotational angle θ of the detent plate 18 is 90 degrees (second angle value), and is maximized when the rotational angle θ of the detent plate 18 is 270 degrees (fourth angle value). Thus, the phase of the reciprocating movement of the tapered member 48 (i.e., locus of position of the tapered member 48) indicated by the solid line and the phase of the reciprocating movement of the spool valve member 26a (i.e., locus of position of the spool valve member 26a) indicated by the one-dot chain line are offset from each other by 90 degrees of the rotational angle θ of the detent plate 18, namely, by an amount corresponding to one-quarter of the cycle of the reciprocating movements of the tapered member 48 and the spool valve member 26a.

Further, as is understood from also FIG. 6, when an operation is made to establish the D range or the R range in the vehicle 10, it is possible to cause the tapered member 48 of the parking lock mechanism 22 to be positioned in the D/R position to place the parking lock mechanism 22 in the unlocking state in which the parking gear 52 is allowed to be rotated, and also to cause the spool valve member 26a of the manual valve mechanism 26 to be positioned in the D position or the R position to place the manual valve mechanism 26 in the forward driving state or the reverse driving state in which the vehicle 10 is enabled to run in the forward or reverse direction. When an operation is made to establish the P range or the N range in the vehicle 10, it is possible to cause the tapered member 48 of the parking lock mechanism 22 to be positioned in the P position or the N position to place the parking lock mechanism 22 in the locking state or the unlocking state in which the parking gear 52 is allowed to be rotated or inhibited from being rotated, and also to cause the spool valve member 26a of the manual valve mechanism 26 to be positioned in the P/N position to place the manual valve mechanism 26 in the transmission cut-off state in which the transmission of the drive force is cut off in the vehicle 10. Further, since the recessed portion 32p corresponding to the P range and the recessed portion 32n corresponding to the N range are located in respective positions diagonal to each other in the circumferential direction about the rotational axis about which the detent plate 18 is to be rotated, when either the P range or the N range is established in the vehicle 10, it is possible to cause the spool valve member 26a to be positioned in the P/N position that is common to the P range and the N range. Further, since the recessed portion 32r corresponding to the R range and the recessed portion 32d corresponding to the D range are located in respective positions diagonal to each other in the circumferential direction about the rotational axis, when either the R range or the D range is established in the vehicle 10, it is possible to cause the tapered member 48 to be positioned in the D/R position that is common to the R range and the D range.

There will be described operation of the range switching device 12. In the reference operating state of the range switching device 12 in which the P range is established in the vehicle 10, as shown in FIG. 1, the roller 38 of the detent positioning mechanism 28 is in contact with the recessed portion 32p of the detent plate 18 that is positioned in the reference position in the circumferential direction. In this instance, owing to the biasing force of the detent spring 36 forcing the roller 38 toward the recessed portion 32p, the roller 38 cooperates with the recessed portion 32p to maintain the angle value of the rotational angle θ of the detent plate 18 that corresponds to the P range.

The view (a) of FIG. 5 shows the range switching device 12 as seen from the upper side of the range switching device 12, when the range switching device 12 is placed in the reference operating state as in FIG. 1. As shown in FIG. 1 and the view (a) of FIG. 5, the connecting portion 42 of the detent plate 18 is positioned in its rightmost position as seen in the drawing sheets, whereby the second member 20b of the first link rod 20 is also positioned in its rightmost position as seen in the drawing sheets. Further, the tapered member 48 connected to the second member 20b is positioned in its rightmost position as seen in the drawing sheets, whereby the parking pawl 50 is in contact with the large diameter portion of the tapered surface 48a of the tapered member 48. Thus, the parking lock mechanism 22 is placed in the locking state in which the meshing teeth 50a of the parking pawl 50 meshes with the outer peripheral teeth 52a of the parking gear 52. Further, meanwhile, as shown in FIG. 1, the spool valve member 26a of the manual valve mechanism 26 is positioned in the P/N position through the second link rod 24 so that the manual valve mechanism 26 is placed in the transmission cut-off state by which the transmission of the drive force is cut off in the vehicle 10.

When the shift shaft 16 and detent plate 18 are clockwise rotated by the electric motor 14 from the reference operating state of the range switching device 12 shown in FIG. 1 in which the P range is established in the vehicle 10, the roller 38 is moved out from the recessed portion 32p against the biasing force of the detent spring 36 and is then moved along the outer peripheral end portion of the detent plate 18 toward the recessed portion 32r. In this instance, since the roller 38 is held by the detent spring 36, the detent plate 18 is moved relative to the roller 38.

When the roller 38 is brought into contact with the recessed portion 32r of the detent plate 18 that is positioned, by rotation of the detent plate 18, in the reference position in the circumferential direction, as shown in FIG. 2, the R range is established in the vehicle 10. The view (b) of FIG. 5 shows the range switching device 12 as seen from the upper side of the range switching device 12, when the range switching device 12 is placed in the operating state by which the R range is established in the vehicle 10. As shown in FIG. 2 and the view (b) of FIG. 5, the connecting portion 42 of the detent plate 18 is positioned in its lowermost position as seen in the drawing sheets, whereby the second member 20b of the first link rod 20 and the tapered member 48 are moved leftward (as seen in the drawing sheets) from the reference operating state (in which the P range is established) shown in FIG. 1. In this instance, the tapered member 48 of the parking lock mechanism 22 is positioned in the D/R position whereby the meshing of the meshing teeth 50a of the parking pawl 50 with the outer peripheral teeth 52a of the parking gear 52 is released so that the parking lock mechanism 22 is placed in the unlocking state. Further, meanwhile, the spool valve member 26a of the manual valve mechanism 26 is positioned in the R position through the second link rod 24, as shown in FIG. 2, whereby the vehicle 10 is enabled to run in the reverse direction.

Further, when the shift shaft 16 and detent plate 18 are clockwise rotated by the electric motor 14 from the operating state of the range switching device 12 shown in FIG. 2 in which the R range is established in the vehicle 10, the roller 38 is moved out from the recessed portion 32r against the biasing force of the detent spring 36 and is then moved along the outer peripheral end portion of the detent plate 18 toward the recessed portion 32n.

When the roller 38 is brought into contact with the recessed portion 32n of the detent plate 18 that is positioned, by rotation of the detent plate 18, in the reference position in the circumferential direction, as shown in FIG. 3, the N range is established in the vehicle 10. The view (c) of FIG. 5 shows the range switching device 12 as seen from the upper side of the range switching device 12, when the range switching device 12 is placed in the operating state by which the N range is established in the vehicle 10. As shown in FIG. 3 and the view (c) of FIG. 5, the connecting portion 42 of the detent plate 18 is positioned in its leftmost position as seen in the drawing sheets, whereby the second member 20b of the first link rod 20 and the tapered member 48 are positioned in their leftmost positions. In this instance, the tapered member 48 of the parking lock mechanism 22 is positioned in the N position whereby the meshing of the meshing teeth 50a of the parking pawl 50 with the outer peripheral teeth 52a of the parking gear 52 is kept released so that the unlocking state of the parking lock mechanism 22 is maintained. Further, meanwhile, the spool valve member 26a of the manual valve mechanism 26 is positioned in the P/N position through the second link rod 24, as shown in FIG. 3, whereby the transmission of the drive force is cut off in the vehicle 10.

Further, when the shift shaft 16 and detent plate 18 are clockwise rotated by the electric motor 14 from the operating state of the range switching device 12 shown in FIG. 3 in which the N range is established in the vehicle 10, the roller 38 is moved out from the recessed portion 32n against the biasing force of the detent spring 36 and is then moved along the outer peripheral end portion of the detent plate 18 toward the recessed portion 32d.

When the roller 38 is brought into contact with the recessed portion 32d of the detent plate 18 that is positioned, by rotation of the detent plate 18, in the reference position in the circumferential direction, as shown in FIG. 4, the D range is established in the vehicle 10. The view (b) of FIG. 5 shows the range switching device 12 as seen from the upper side of the range switching device 12, when the range switching device 12 is placed in the operating state by which the D range is established in the vehicle 10. As shown in FIG. 4 and the view (b) of FIG. 5, the connecting portion 42 of the detent plate 18 is positioned in its uppermost position as seen in the drawing sheets, whereby the second member 20b of the first link rod 20 and the tapered member 48 are moved rightward (as seen in the drawing sheets) from the operating state (in which the N range is established) shown in FIG. 3. In this instance, the tapered member 48 of the parking lock mechanism 22 is positioned in the D/R position just as in the FIG. 2 whereby the meshing of the meshing teeth 50a of the parking pawl 50 with the outer peripheral teeth 52a of the parking gear 52 is kept released so that the unlocking state of the parking lock mechanism 22 is maintained. Further, meanwhile, the spool valve member 26a of the manual valve mechanism 26 is positioned in the D position through the second link rod 24, as shown in FIG. 4, whereby the vehicle 10 is enabled to run in the forward direction.

Further, when the shift shaft 16 and detent plate 18 are clockwise rotated by the electric motor 14 from the operating state of the range switching device 12 shown in FIG. 4 in which the D range is established in the vehicle 10, the roller 38 is moved out from the recessed portion 32d against the biasing force of the detent spring 36 and is then moved along the outer peripheral end portion of the detent plate 18 toward the recessed portion 32p. Then, when the roller 38 is brought into contact with the recessed portion 32p of the detent plate 18 that is positioned in the reference position in the circumferential direction by rotation of the detent plate 18, as shown in FIG. 1, the P range is returned to be established in the vehicle 10.

Thus, when the detent plate 18 has been rotated in clockwise direction by 360 degrees, i.e., by one rotation, form the reference operating state by which the P range is established in the vehicle 10 as shown in FIG. 0.1, the P range is returned to be established in the vehicle 10, after the R range, the N range and D range have been sequentially established in this order of description.

Further, when the shift shaft 16 and detent plate 18 are rotated in counterclockwise direction from the reference operating state of the range switching device 12 shown in FIG. 1 in which the P range is established in the vehicle 10, the roller 38 is moved out from the recessed portion 32p against the biasing force of the detent spring 36 and is then moved along the outer peripheral end portion of the detent plate 18 toward the recessed portion 32d. Then, when the roller 38 is brought into contact with the recessed portion 32d of the detent plate 18 that is positioned in the reference position in the circumferential direction, as shown in FIG. 4, the D range is established in the vehicle 10. In this instance, the range switching device 12 is placed in the operating state shown in FIG. 4 and the view (b) of FIG. 5, so that the parking lock mechanism 22 is placed in the unlocking state, and the spool valve member 26a of the manual valve mechanism 26 is positioned in the D position whereby the manual valve mechanism 26 is placed in the forward driving state in which the vehicle 10 is enabled to run in the forward direction.

Further, when the shift shaft 16 and detent plate 18 are rotated in counterclockwise direction from the operating state of the range switching device 12 shown in FIG. 4 and the view (b) of FIG. 5 in which the D range is established in the vehicle 10, the roller 38 is moved out from the recessed portion 32d against the biasing force of the detent spring 36 and is then moved along the outer peripheral end portion of the detent plate 18 toward the recessed portion 32n. Then, when the roller 38 is brought into contact with the recessed portion 32n of the detent plate 18 that is positioned in the reference position in the circumferential direction, as shown in FIG. 3, the N range is established in the vehicle 10. In this instance, the range switching device 12 is placed in the operating state shown in FIG. 3 and the view (c) of FIG. 5, so that the parking lock mechanism 22 is placed in the unlocking state, and the spool valve member 26a of the manual valve mechanism 26 is positioned in the P/N position whereby the manual valve mechanism 26 is placed in the transmission cut-off state in which the transmission of the drive force is cut off in the vehicle 10.

Further, when the shift shaft 16 and detent plate 18 are rotated in counterclockwise direction from the operating state of the range switching device 12 shown in FIG. 3 and the view (c) of FIG. 5 in which the N range is established in the vehicle 10, the roller 38 is moved out from the recessed portion 32n against the biasing force of the detent spring 36 and is then moved along the outer peripheral end portion of the detent plate 18 toward the recessed portion 32r. Then, when the roller 38 is brought into contact with the recessed portion 32r of the detent plate 18 that is positioned in the reference position in the circumferential direction, as shown in FIG. 2, the R range is established in the vehicle 10. In this instance, the range switching device 12 is placed in the operating state shown in FIG. 2 and the view (b) of FIG. 5, so that the parking lock mechanism 22 is placed in the unlocking state, and the spool valve member 26a of the manual valve mechanism 26 is positioned in the R position whereby the manual valve mechanism 26 is placed in the reverse driving state in which the vehicle 10 is enabled to run in the reverse direction.

Further, when the shift shaft 16 and detent plate 18 are rotated in counterclockwise direction from the operating state of the range switching device 12 shown in FIG. 2 and the view (b) of FIG. 5 in which the R range is established in the vehicle 10, the roller 38 is moved out from the recessed portion 32r against the biasing force of the detent spring 36 and is then moved along the outer peripheral end portion of the detent plate 18 toward the recessed portion 32p. Then, when the roller 38 is brought into contact with the recessed portion 32p of the detent plate 18 that is positioned in the reference position in the circumferential direction, as shown in FIG. 1, the P range is established in the vehicle 10.

Thus, when the detent plate 18 has been rotated in counterclockwise direction by 360 degrees, i.e., by one rotation, form the reference operating state by which the P range is established in the vehicle 10 as shown in FIG. 0.1, the P range is returned to be established in the vehicle 10, after the D range, the N range and R range have been sequentially established in this order of description.

As described above, the recessed portions 32 are provided in the outer peripheral end portion of the detent plate 18 and are arranged in the circumferential direction about the rotational axis at the predetermined angular pitch (90 degrees). Owing to the provisions of the recessed portions 32 in the outer peripheral end portion of the detent plate 18 at the predetermined angular pitch in the circumferential direction, the shift ranges can be switched periodically by rotation of the detent plate 18. Thus, it is possible to increase a degree of freedom in designing a pattern of switching between the shift ranges, so that the recessed portion 32p corresponding to the P range and the recessed portion 32d corresponding to the D range can be provided in respective positions adjacent to each other in the circumferential direction about the rotational axis about which the detent plate 18 is to be rotated. Owing to this arrangement, the P range and the D range can be switched directly to each other by rotation of the detent plate 18 without via the other shift ranges (R range, N range). That is, in the switching transition between the P range and the D range, either one of the P range and the D range can be switched to the other of the P range and the D range without via the R range and the N range. Thus, the switching between the P range and the D range can be performed with an improved response. Further, even when the range switching device 12 cannot be operated by the electric motor 14, for example, due to failure of an electric source, during the switching transition between the P range and the D range, it is possible to avoid the R range from being established, namely, avoid an unintended one of the shift ranges from being established.

As described above, in the present embodiment, while the detent plate 18 is rotated from a state in which any one of the shift ranges is established, the others of the shift ranges are sequentially established, and when the detent plate 18 has been rotated by one rotation from the state, the same one of the shift ranges is returned to be established. This feature arrangement makes it possible to increase a degree of freedom in designing a pattern of switching between the shift ranges, as compared with an arrangement in which the shift ranges are to be established by rotation of a detent plate by a certain angle value of the rotational angle θ. In connection with this feature arrangement, the P range and the D range can be switched directly to each other by rotation of the detent plate 18 without via any other of the shift ranges that is other than the P range and the D range. Thus, even when the detent plate 18 cannot be rotated, for example, due to failure of the electric source, during the switching transition between the P range and the D range, it is possible to prevent the unintended one of the shift ranges from being established.

In the present embodiment, the recessed portion 32p cooperates with the roller 38 to maintain a corresponding angle value of the rotational angle θ of the detent plate 18 by which the P range is established in the vehicle 10, while the recessed portion 32d cooperates with the roller 38 to maintain a corresponding angle value of the rotational angle θ of the detent plate 18 by which the D range is established in the vehicle 10, such that the recessed portions 32p, 32d are located in respective positions adjacent to each other in the circumferential direction. Owing to this arrangement, the P range and the D range can be switched directly to each other by rotation of the detent plate 18 without via any other of the shift ranges that is other than the P range and the D range.

In the present embodiment, the parking lock mechanism 22 can be placed in one of the plurality of operating states thereof which corresponds to a position of the tapered member 48 of the parking lock mechanism 22 that is be changed by the reciprocating movement of the first link rod 20 caused by rotation of the detent plate 18. Further, the manual valve mechanism 26 can be placed in one of the plurality of operating states thereof which corresponds to a position of the spool valve member 26a of the manual valve mechanism 26 that is to be changed by the reciprocating movement of the second link rod 24 caused by rotation of the detent plate 18, such that each of the N range, the D range and the R range can be established depending on the selected one of the plurality of operating states of the manual valve mechanism 26.

In the present embodiment, the four recessed portions 32, each of which cooperates with the roller 38 to maintain a corresponding angle value of the rotational angle θ of the detent plate 18 by which a corresponding one of the P range, the R range, the N range and the D range is established in the vehicle 10, are arranged in the circumferential direction at the angular pitch of 90 degrees, such that the recessed portions 32p, 32n are located in respective positions diagonal to each other in the circumferential direction, and such that, when each of the first and second link rods 20, 24 is reciprocatingly moved by rotation of the detent plate 18, the reciprocating movements of the respective first and second link rods 20, 24 are offset in phase from each other by 90 degrees. This arrangement makes it possible to cause the parking lock mechanism 22 to place in either its locking state or unlocking state in a state in which the manual valve mechanism 26 is placed in its transmission cut-off state. Therefore, when the P range is to be established in the vehicle 10, the P range can be established with the manual valve mechanism 26 being placed in the transmission cut-off state and which the parking lock mechanism 22 being placed in the locking state.

In the present embodiment in which the rotational angle θ of the detent plate 18 is detected by the absolute angle sensor 30, the shift ranges can be reliably switched between each other based on the rotational angle θ of the detent plate 18 detected by the absolute angle sensor 30. Further, since the rotational angle θ of the detent plate 18 is detected by the absolute angle sensor 30, the detection of the rotational angle θ of the detent plate 18 can be made even when the detent plate 18 is rotated by one rotation or more.

There will be described other embodiments of this invention. The same reference signs as used in the above-described first embodiment will be used in the following embodiments, to identify the functionally corresponding elements, and descriptions thereof are not provided.

Second Embodiment

Figure 7:
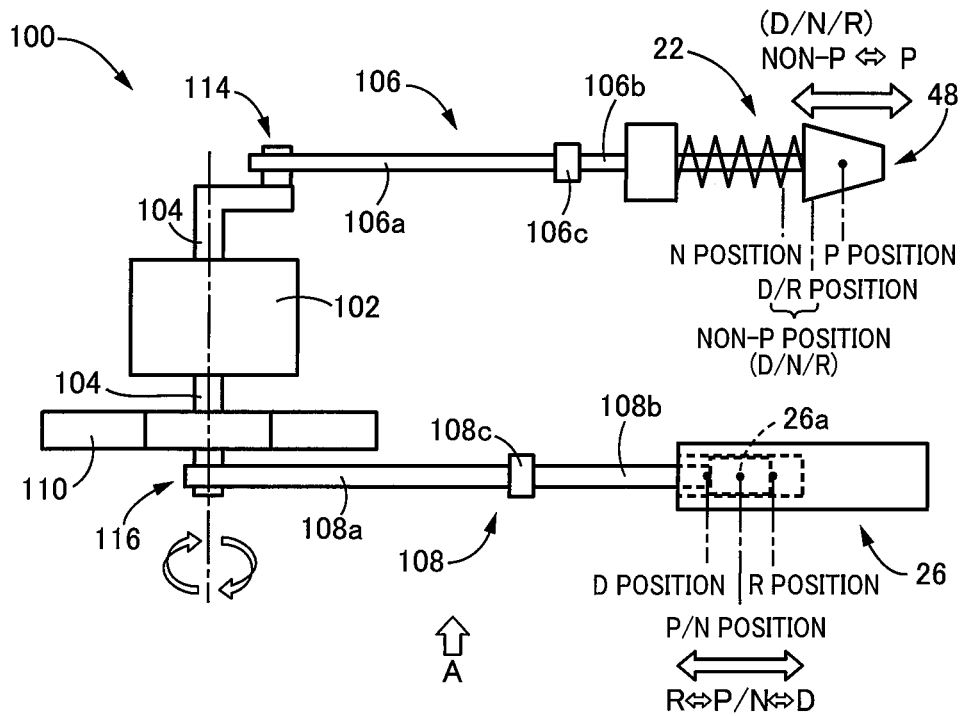
FIG. 7 is a view of a vehicle range switching device constructed according to a second embodiment of the present invention, when being installed in the vehicle, wherein the view is as seen from an upper side of the range switching device.
Figure 8:
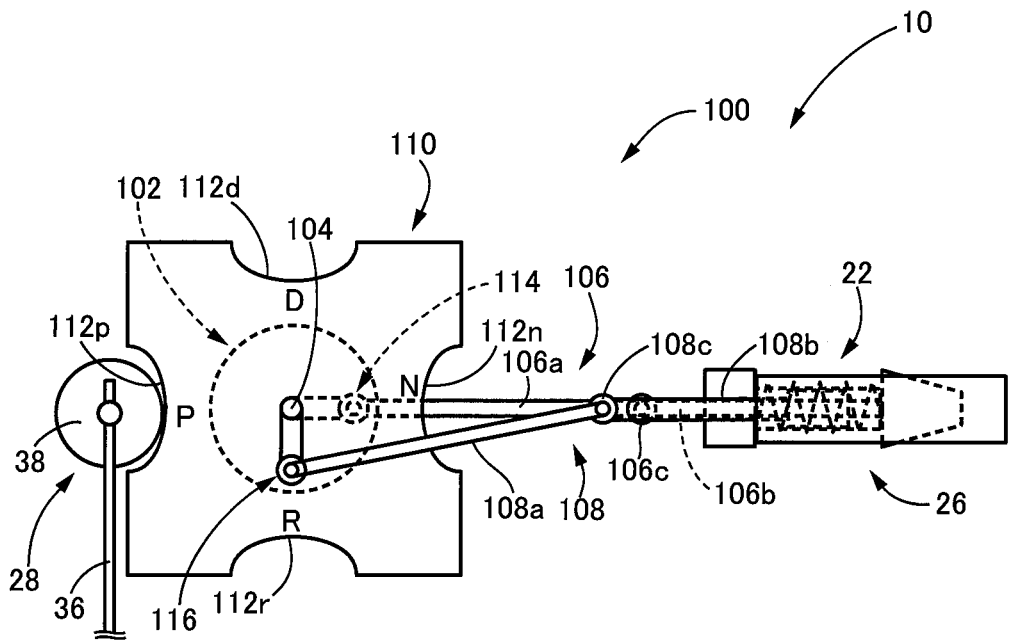
FIG. 8 is a view of the vehicle range switching device of FIG. 7, as seen from a direction of arrow A indicated in FIG. 7.

FIGS. 7 and 8 are views showing a construction of a range switching device 100 constructed according to a second embodiment of the invention. FIG. 7 is a view of the range switching device 100 when being installed in the vehicle 10, wherein the view is as seen from an upper side of the range switching device 100. FIG. 8 is a view of the range switching device 100 of FIG. 7, as seen from a direction of arrow A indicated in FIG. 7. It is noted that the detent positioning mechanism 28 is not illustrated in FIG. 7.

In the range switching device 100 of this second embodiment, a shift shaft 104, which is to be rotated by an electric motor 102, protrudes from opposite sides of the electric motor 102. The shift shaft 104 is connected at one of its longitudinally opposite end portions to a first link rod 106 by which the parking lock mechanism 22 is to be operated, and is connected at the other of its longitudinally opposite end portions to a second link rod 108 by which the manual valve mechanism 26 is to be operated. It is noted that each of the one and the other of the longitudinally opposite end portions of the shift shaft 104, to which the first and second link rods 106, 108 are connected, is offset from the rotational axis of a detent plate 110, as shown in FIG. 8.

The range switching device 100 includes: the electric motor 102; the shift shaft 104 that is to be rotated by the electric motor 102; the detent plate 110 that is connected to the shift shaft 104 so as to be rotated integrally with the shift shaft 104; the first link rod 106 that is connected to the above-described one of the longitudinally opposite end portions of the shift shaft 104 so as to be reciprocatingly moved with rotation of the shift shaft 104; the second link rod 108 that is connected to the above-described other of the longitudinally opposite end portions of the shift shaft 104 so as to be reciprocatingly moved with rotation of the shift shaft 104; the parking lock mechanism 22 that is to be placed in one of the operating states which is selected depending on the reciprocating movement of the first link rod 106; the manual valve mechanism 26 that is to be placed in one of the operating states which is selected depending on the reciprocating movement of the second link rod 108; and the detent positioning mechanism 28. It is noted that the parking lock mechanism 22, manual valve mechanism 26 and detent positioning mechanism 28 are substantially the same as those in the above-described first embodiment, so that the same reference signs as used in the first embodiment will be used for these mechanisms 22, 26, 28, and descriptions thereof are not provided.

The first link rod 106 includes: a first member 106a connected to the shift shaft 104; a second member 106b connected at its longitudinally distal end portion to the tapered member 48 of the parking lock mechanism 22; and a joint portion 106c connecting the first and second members 106a, 106b while allowing bending or inclination of the first member 106a relative to the second member 106b. The above-described one of the longitudinally opposite end portions of the shift shaft 104 to which the first member 106a of the first link rod 106 is connected, is constituted by a first connecting portion 114 that is located in a position offset from the rotational axis about which the shift shaft 104 and the detent plate 110 are to be rotated, such that the first member 106a is pivotable about the joint portion 106c. The first connecting portion 114 is moved, together with rotations of the shift shaft 104 and detent plate 110, along a circle whose center lies on the above-described rotational axis, i.e., an axis of the shift shaft 104. Thus, when the shift shaft 104 and detent plate 110 are rotated, the second member 106b of the first link rod 106 is reciprocatingly moved and the first member 106a of the first link rod 106 is pivoted about the joint portion 106c.

The second link rod 108 includes: a first member 108a connected to the shift shaft 104; a second member 108b connected at its longitudinally distal end portion to the spool valve member 26a of the manual valve mechanism 26; and a joint portion 108c connecting the first and second members 108a, 108b while allowing bending or inclination of the first member 108a relative to the second member 108b. The above-described other of the longitudinally opposite end portions of the shift shaft 104 to which the first member 108a of the second link rod 108 is connected, is constituted by a second connecting portion 116 that is located in a position offset from the rotational axis about which the shift shaft 104 and the detent plate 110 are to be rotated, such that the first member 108a is pivotable about the joint portion 108c. The second connecting portion 116 is moved, together with rotations of the shift shaft 104 and detent plate 110, along a circle whose center lies on the above-described rotational axis, i.e., the axis of the shift shaft 104. Thus, when the shift shaft 104 and detent plate 110 are rotated, the second member 108b of the second link rod 108 is reciprocatingly moved and the first member 108a of the second link rod 108 is pivoted about the joint portion 108c.

The detent plate 110, which is connected to the shift shaft 104, is to be rotated integrally with the shift shaft 104. The detent plate 110 is constituted by a square-shaped plate member having a predetermined thickness. The detent plate 110 has four recessed portions 112$p$, 112$r$, 112$n$, 112$d$ which are provided in four sides located in an outer peripheral end portion of the detent plate 110, and which are arranged in a circumferential direction about the rotational axis at a predetermined angular pitch (90 degrees). When the recessed portion 112$p$ corresponding to the P range is positioned in the reference position in the circumferential direction, the roller 38 of the detent positioning mechanism 28 is brought into contact with the recessed portion 112$p$ and cooperates with the recessed portion 112$p$ to maintain a corresponding angle value of the rotational angle θ of the detent plate 110 by which the P range is established in the vehicle 10. When the recessed portion 112$r$ corresponding to the R range is positioned in the reference position in the circumferential direction, the roller 38 is brought into contact with the recessed portion 112$r$ and cooperates with the recessed portion 112$r$ to maintain a corresponding angle value of the rotational angle θ of the detent plate 110 by which the R range is established in the vehicle 10. When the recessed portion 112$n$ corresponding to the N range is positioned in the reference position in the circumferential direction, the roller 38 is brought into contact with the recessed portion 112$n$ and cooperates with the recessed portion 112$n$ to maintain a corresponding angle value of the rotational angle θ of the detent plate 110 by which the N range is established in the vehicle 10. When the recessed portion 112$d$ corresponding to the D range is positioned in the reference position in the circumferential direction, the roller 38 is brought into contact with the recessed portion 112$d$ and cooperates with the recessed portion 112$d$ to maintain a corresponding angle value of the rotational angle θ of the detent plate 110 by which the D range is established in the vehicle 10. It is noted that the recessed portions 112$p$, 112$r$, 112$n$, 112$d$ correspond to "engaged portions" recited in the appended claims.

In the present second embodiment, the recessed portion 112$p$ cooperates with the roller 38 to maintain a corresponding angle value of the rotational angle θ of the detent plate 110 by which the P range is established in the vehicle 10, while the recessed portion 112$d$ cooperates with the roller 38 to maintain a corresponding angle value of the rotational angle θ of the detent plate 110 by which the D range is established in the vehicle 10, such that the recessed portions 112$p$, 112$d$ are located in respective positions adjacent to each other in the circumferential direction, as in the above-described first embodiment. Further, the recessed portions 112$p$, 112$n$, each of which cooperates with the roller 38 to maintain a corresponding angle value of the rotational angle θ of the detent plate 110 by which a corresponding one of the P range and the N range is established in the vehicle 10, are located in respective positions diagonal to each other in the circumferential direction, as in the above-described first embodiment. It is noted that the recessed portions 112$p$, 112$d$, 112$n$ corresponding to "first recessed portion", "second recessed portion" and "third recessed portion", respectively, which are recited in the appended claims.

In the present second embodiment, the direction of the movement of the second member 106$b$ of the first link rod 106 and the direction of the movement of the second member 108$b$ of the second link rod 108 are parallel to each other. However, as shown in FIG. 8, the first connecting portion 114 to which the first link rod 106 is connected and the second connecting portion 116 to which the second link rod 108 is connected are located in respective positions that are offset from each other by 90 degrees in the circumferential direction about the rotational axis about which the detent plate 110 is to be rotated. Therefore, the reciprocating movement of the second member 106$b$ of the first link rod 106 and the reciprocating movement of the second member 108$b$ of the second link rod 108 are offset in phase from each other by 90 degrees, as in the above-described first embodiment. In connection with this feature, as shown in FIG. 6 that is referred to in the description of the above-described first embodiment, the phase of the reciprocating movement of the tapered member 48 of the parking lock mechanism 22 and the phase of the reciprocating movement of the spool valve member 26$a$ of the manual valve mechanism 26 are offset from each other by 90 degrees, so that a positional relationship between the tapered member 48 and the spool valve member 26$a$ in each angle value level of the rotational angle θ of the detent plate 110 can established as shown in FIG. 6. Therefore, the range switching device 100 can be operated to provide substantially the same technical advantages as the range switching device 12 of the above-described first embodiment.

In the range switching device 100 according to the present second embodiment, too, the recessed portions 112$p$, 112$d$, each of which cooperates with the roller 38 to maintain a corresponding angle value of the rotational angle θ of the detent plate 110 by which a corresponding one of the P range and the D range is established in the vehicle 10, are located in respective positions adjacent to each other in the circumferential direction. Therefore, in the switching transition between the P range and the D range, either one of the P range and the D range can be switched to the other of the P range and the D range without via the other ranges. Thus, substantially the same technical advantages can be obtained as in the above-described first embodiment.

Third Embodiment

Figure 9:
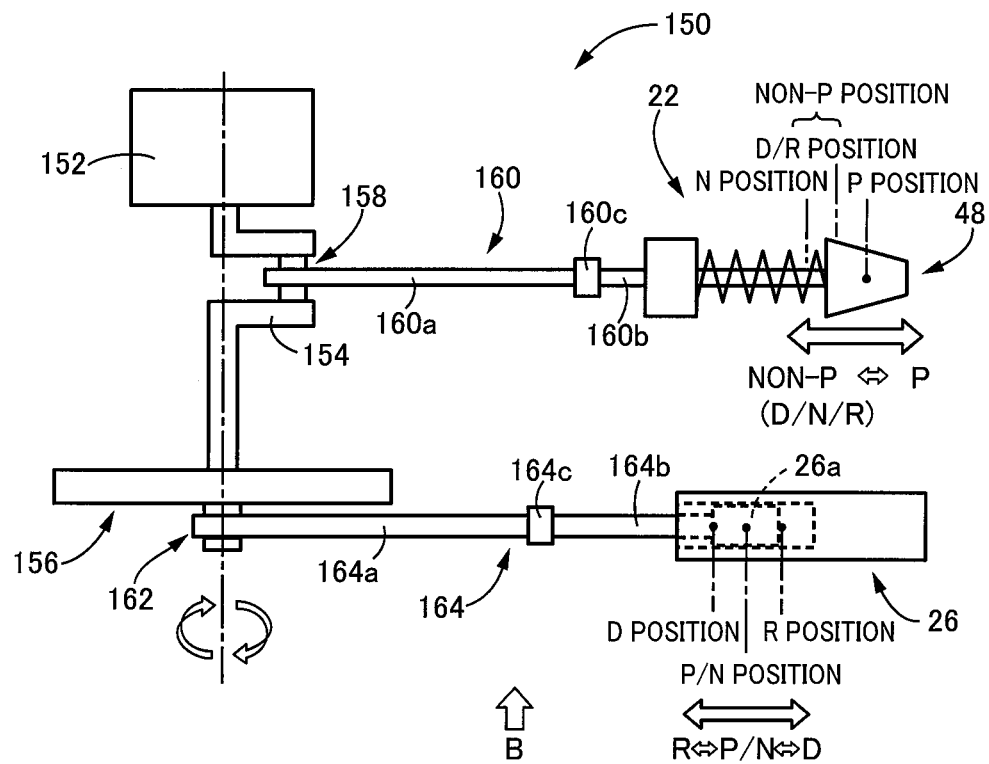
FIG. 9 is a view of a vehicle range switching device constructed according to a third embodiment of the present invention, when being installed in the vehicle, wherein the view is as seen from an upper side of the range switching device.
Figure 10:
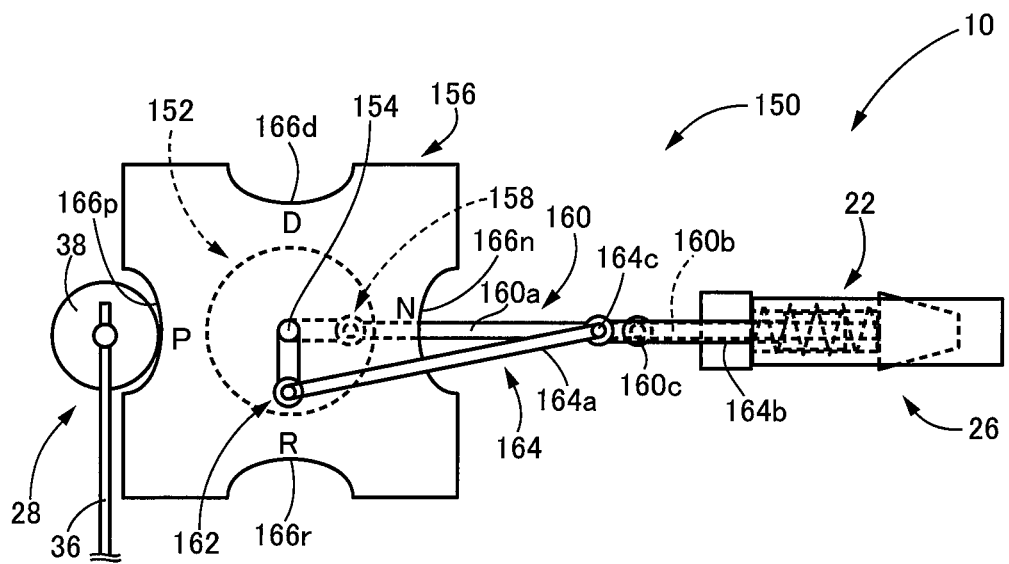
FIG. 10 is a view of the vehicle range switching device of FIG. 9, as seen from a direction of arrow B indicated in FIG. 9.

FIGS. 9 and 10 are views showing a construction of a range switching device 150 constructed according to a third embodiment of the invention. FIG. 9 is a view of the range switching device 150 when being installed in the vehicle 10, wherein the view is as seen from an upper side of the range switching device 150. FIG. 10 is a view of the range switching device 150 of FIG. 9, as seen from a direction of arrow B indicated in FIG. 9. It is noted that the detent positioning mechanism 28 is not illustrated in FIG. 9.

The range switching device 150 of this third embodiment includes: an electric motor 152; a shift shaft 154 that is to be rotated by the electric motor 152; a detent plate 156 that is connected to the shift shaft 154 so as to be rotated integrally with the shift shaft 154; a first link rod 160 that is connected to a first connecting portion 158 of the shift shaft 154 so as to be reciprocatingly moved with rotation of the shift shaft 154; a second link rod 164 that is connected to a second connecting portion 162 of the shift shaft 154 so as to be reciprocatingly moved with rotation of the shift shaft 154; the parking lock mechanism 22 that is to be placed in one of the operating states which is selected depending on the reciprocating movement of the first link rod 160; the manual valve mechanism 26 that is to be placed in one of the operating states which is selected depending on the reciprocating movement of the second link rod 164; and the detent positioning mechanism 28. It is noted that the parking lock mechanism 22, manual valve mechanism 26 and detent positioning mechanism 28 are substantially the same as those in the above-described first and second embodiments, so that the same reference signs as used in the first embodiment will be used for these mechanisms 22, 26, 28, and descriptions thereof are not provided.

The first link rod 160 includes: a first member 160*a* connected to a first connecting portion 158 of the shift shaft 154; a second member 160*b* connected at its longitudinally distal end portion to the tapered member 48 of the parking lock mechanism 22; and a joint portion 160*c* connecting the first and second members 160*a*, 160*b* while allowing bending or inclination of the first member 160*a* relative to the second member 160*b*. The first connecting portion 158 is located in a position offset from the rotational axis about which the shift shaft 154 and the detent plate 156 are to be rotated, such that the first member 160*a* is pivotable about the joint portion 160*c*. The first connecting portion 158 is moved, together with rotations of the shift shaft 154 and detent plate 156, along a circle whose center lies on the above-described rotational axis, i.e., an axis of the shift shaft 154. Thus, when the shift shaft 154 and detent plate 156 are rotated, the second member 160*b* of the first link rod 160 is reciprocatingly moved and the first member 160*a* of the first link rod 160 is pivoted about the joint portion 160*c*.

The second link rod 164 includes: a first member 164*a* connected to a second connecting portion 162 of the shift shaft 154; a second member 164*b* connected at its longitudinally distal end portion to the spool valve member 26*a* of the manual valve mechanism 26; and a joint portion 164*c* connecting the first and second members 164*a*, 164*b* while allowing bending or inclination of the first member 164*a* relative to the second member 164*b*. The second connecting portion 162 is located in a position offset from the rotational axis about which the shift shaft 154 and the detent plate 156 are to be rotated, such that the first member 164*a* is pivotable about the joint portion 164*c*. The second connecting portion 162 is moved, together with rotations of the shift shaft 154 and detent plate 156, along a circle whose center lies on the above-described rotational axis, i.e., the axis of the shift shaft 154. Thus, when the shift shaft 154 and detent plate 156 are rotated, the second member 164*b* of the second link rod 164 is reciprocatingly moved and the first member 164*a* of the second link rod 164 is pivoted about the joint portion 164*c*.

The detent plate 156, which is connected to the shift shaft 154, is to be rotated integrally with the shift shaft 154. The detent plate 156 is constituted by a square-shaped plate member having a predetermined thickness. The detent plate 156 has four recessed portions 166*p*, 166*r*, 166*n*, 166*d* which are provided in four sides located in an outer peripheral end portion of the detent plate 156, and which are arranged in a circumferential direction about the rotational axis at a predetermined angular pitch (90 degrees). When the recessed portion 166*p* corresponding to the P range is positioned in the reference position in the circumferential direction, the roller 38 of the detent positioning mechanism 28 is brought into contact with the recessed portion 166*p* and cooperates with the recessed portion 166*p* to maintain a corresponding angle value of the rotational angle θ of the detent plate 156 by which the P range is established in the vehicle 10. When the recessed portion 166*r* corresponding to the R range is positioned in the reference position in the circumferential direction, the roller 38 is brought into contact with the recessed portion 166*r* and cooperates with the recessed portion 166*r* to maintain a corresponding angle value of the rotational angle θ of the detent plate 156 by which the R range is established in the vehicle 10. When the recessed portion 166*n* corresponding to the N range is positioned in the reference position in the circumferential direction, the roller 38 is brought into contact with the recessed portion 166*n* and cooperates with the recessed portion 166*n* to maintain a corresponding angle value of the rotational angle θ of the detent plate 156 by which the N range is established in the vehicle 10. When the recessed portion 166*d* corresponding to the D range is positioned in the reference position in the circumferential direction, the roller 38 is brought into contact with the recessed portion 166*d* and cooperates with the recessed portion 166*d* to maintain a corresponding angle value of the rotational angle θ of the detent plate 156 by which the D range is established in the vehicle 10. It is noted that the recessed portions 166*p*, 166*r*, 166*n*, 166*d* correspond to "engaged portions" recited in the appended claims.

In the present third embodiment, the recessed portion 166*p* cooperates with the roller 38 to maintain a corresponding angle value of the rotational angle θ of the detent plate 156 by which the P range is established in the vehicle 10, while the recessed portion 166*d* cooperates with the roller 38 to maintain a corresponding angle value of the rotational angle θ of the detent plate 156 by which the D range is established in the vehicle 10, such that the recessed portions 166*p*, 166*d* are located in respective positions adjacent to each other in the circumferential direction, as in the above-described first embodiment. Further, the recessed portions 166*p*, 166*n*, each of which cooperates with the roller 38 to maintain a corresponding angle value of the rotational angle θ of the detent plate 156 by which a corresponding one of the P range and the N range is established in the vehicle 10, are located in respective positions diagonal to each other in the circumferential direction, as in the above-described first and second embodiments. It is noted that the recessed portions 166*p*, 166*d*, 166*n* corresponding to "first recessed portion", "second recessed portion" and "third recessed portion", respectively, which are recited in the appended claims.

In the present third embodiment, too, as shown in FIG. 10, the first connecting portion 158 to which the first link rod 160 is connected and the second connecting portion 162 to which the second link rod 164 is connected are located in respective positions that are offset from each other by 90 degrees in the circumferential direction about the rotational axis about which the detent plate 156 is to be rotated. Therefore, the reciprocating movement of the second member 160*b* of the first link rod 160 and the reciprocating movement of the second member 164*b* of the second link rod 164 are offset in phase from each other by 90 degrees, as in the above-described first and second embodiments. In connection with this feature, as shown in FIG. 6 that is referred to in the description of the above-described first embodiment, the phase of the reciprocating movement of the tapered member 48 of the parking lock mechanism 22 and the phase of the reciprocating movement of the spool valve member 26*a* of the manual valve mechanism 26 are offset from each other by 90 degrees, so that a positional relationship between the tapered member 48 and the spool valve member 26*a*. in each angle value level of the rotational angle θ of the detent plate 156 can established as shown in FIG. 6. Therefore, the range switching device 150 can be operated to provide substantially the same technical advantages as the range switching devices 12, 100 of the above-described first and second embodiments.

In the range switching device 150 according to the present second embodiment, too, the recessed portions 166*p*, 166*d*, each of which cooperates with the roller 38 to maintain a corresponding angle value of the rotational angle θ of the detent plate 156 by which a corresponding one of the P range and the D range is established in the vehicle 10, are located in respective positions adjacent to each other in the circumferential direction. Therefore, in the switching transition between the P range and the D range, either one of the P range and the D range can be switched to the other of the P range and the D range without via the other ranges. Thus, substantially the same technical advantages can be obtained as in the above-described first and second embodiments.

While the preferred embodiments of this invention have been described in detail by reference to the drawings, it is to be understood that the invention may be otherwise embodied.

For example, in the above-described embodiments, each of the detent plates 18, 110, 156 is constituted by a square-shaped plate member having four shape corners. However, the detent plate may have a shape that is not limited to this detail. For example, each of the four corners of the square-shaped plate member constituting the detent plate may be defined by a curve that smoothly two adjacent sides. Further, the detent plate does not necessarily have to be constituted by a square-shaped plate member, but may be constituted by a circular or otherwise-shaped plate member, as long as, when the detent plate has been rotated by 360 degrees from a state in which any one of the shift ranges is established, the same one of the shift range is returned to be established. Moreover, in the above-described embodiments, the engaging member is constituted by the pressing member in the form of the roller 38, and the engaged portions are constituted by the recessed portions 32, 112, 166. However, the constructions of the engaging member and the engaged portions are not limited to these details. The engaging member and the engaged portions may have any shapes and constructions, as long as the rotational angle θ of the detent plate can be kept at an angle value corresponding to each of the shift ranges by engagement of the engaging member with a corresponding one of the engaged portions.

It is to be understood that the embodiments described above are given for illustrative purpose only, and that the present invention may be embodied with various modifications and improvements which may occur to those skilled in the art.

NOMENCLATURE OF ELEMENTS

10: vehicle
12, 100, 150: range switching device
14, 102, 152: electric motor
18, 110, 156: detent plate
20, 106, 160: first link rod
22: parking lock mechanism
24, 108, 164: second link rod
26: manual valve mechanism (valve mechanism)
26a: spool valve member
30: absolute angle sensor
32p, 32r, 32n, 32d: plurality of recessed portions (plurality of engaged portions)
32p, 112p, 166p: first recessed portion (first engaged portion)
32d, 112d, 166d: second recessed portion (second engaged portion)
32n, 112n, 166n: third recessed portion (third engaged portion)
38: roller (engaging member, pressing member)
48: tapered member (switching member)
112p, 112r, 112n, 112d: plurality of recessed portions (plurality of engaged portions)
166p, 166r, 166n, 166d: plurality of recessed portions (plurality of engaged portions)

What is claimed is:

1. A range switching device for switching between a plurality of shift ranges in a vehicle, the range switching device comprising:
an electric motor;
a detent plate that is rotatable by the electric motor about a rotational axis, the detent plate including an outer peripheral portion including a plurality of engagement portions arranged in a circumferential direction about the rotational axis; and
an engaging member that selectively engages with each of the engagement portions via rotation of the detent plate depending on a rotational angle of the detent plate, and each of the shift ranges is established in the vehicle when the rotational angle of the detent plate is a predetermined corresponding angle value with a corresponding one of the engaged portions being positioned in a reference position in the circumferential direction,
wherein the shift ranges include a parking range in which running of the vehicle is stopped and a forward running range in which the vehicle is enabled to run in a forward direction,
wherein the engaged portions include a first engaged portion and a second engaged portion, the parking range is established when the first engaged portion is positioned in the reference position, and the forward running range is established when the second engaged portion is positioned in the reference position, and
wherein the first engaged portion and the second engaged portion are located directly adjacent to each other in the circumferential direction, the parking range and the forward running range are switched directly between each other by rotation of the detent plate.

2. The range switching device according to claim 1,
wherein the plurality of shift ranges include a reverse running range in which the vehicle is enabled to run in a reverse direction, and a drive-force transmission cut-off range in which transmission of a drive force is cut off, and
wherein the range switching device further comprises:
a first link rod connected to the detent plate,
a second link rod connected to the detent plate each of the first and second link rods reciprocatingly moved by rotation of the detent plate,
a parking lock mechanism including a switching member connected to the first link rod, the parking lock mechanism being placed in one of a plurality of operating states thereof corresponding to a position of the switching member, and
a valve mechanism including a spool valve member that is connected to the second link rod, the valve mechanism being placed in one of a plurality of operating states thereof corresponding to a position of the spool valve member, and each of the drive-force transmission cut-off range, the forward running range, and the reverse running range is established depending on the one of the plurality of operating states of the valve mechanism.

3. The range switching device according to claim 2,
wherein the plurality of engaged portions include four engaged portions which are arranged in the circumferential direction at an angular pitch of 90 degrees, and correspond to the parking range, the reverse running range, the drive-force transmission cut-off range and the forward running range, respectively, wherein the four engaged portions include, in addition to the first and second engaged portions, a third engaged portion corresponding to the drive-force transmission cut-off range, and the drive-force transmission cut-off range is established when the third engaged portion is positioned in the reference position, wherein the first and third engaged portions are located in respective positions diagonal to each other in the circumferential direction, and wherein, when each of the first and second link rods is reciprocatingly moved by rotation of the detent plate, reciprocating movements of the respective first and second link rods are offset in phase from each other by 90 degrees.

4. The range switching device according to claim 1, further comprising an absolute angle sensor configured to detect the rotational angle of the detent plate.

5. The range switching device according to claim 1, wherein the plurality of engaged portions are respective recessed portions, and the engaging member is a pressing member, and wherein, when each of the recessed portions is positioned in the reference position, the pressing member is pressed against the each of the recessed portions.

6. The range switching device according to claim 1, further comprising:

a parking lock mechanism including a switching member; a valve mechanism including a spool valve member; a first link rod connected to the detent plate to operate the parking lock mechanism; and a second link rod connected to the detent plate to operate the valve mechanism, wherein each of the first and second link rods includes a first member, a second member, and a joint portion connecting the first and second members, wherein the first member of each of the first and second link rods is connected at one of longitudinally opposite end portions thereof to one of longitudinally opposite end portions of the second member through the joint portion, and is connected at the other of the longitudinally opposite end portions thereof to a connecting portion which is connected to the detent plate and which is located in a position offset from the rotational axis, wherein the second member of each of the first and second link rods is connected at the other of the longitudinally opposite end portions thereof to a corresponding one of the switching member of the parking lock mechanism and the spool valve member of the valve mechanism, the rotation of the detent plate causing the second member and the joint portion to be linearly moved together with the corresponding one of the switching member and the spool valve member along a straight line passing through the rotational axis, and causes the first member to be pivoted about the joint portion, and wherein each of the parking lock mechanism and the valve mechanism is to be placed in one of a plurality of operating states thereof which corresponds to a position of a corresponding one of the switching member and the spool valve member relative to another member of the each of the parking lock mechanism and the valve mechanism in a direction of the straight line passing through the rotational axis.

7. The range switching device according to claim 6, wherein the second member and the joint portion of each of the first and second link rods are to be reciprocatingly moved together with the corresponding one of the switching member and the spool valve member along the straight line, by the rotation of the detent plate, and a reciprocating movement of the second member and the joint portion has a cycle corresponding to the rotation of the detent plate by 360 degrees, wherein a distance of the joint portion of the first link rod from the another member of the parking lock mechanism in the direction of the straight line is minimized when the rotational angle of the detent plate is a first angle value, and is maximized when the rotational angle of the detent plate is a third angle value, and wherein a distance of the joint portion of the second link rod from the another member of the valve mechanism in the direction of the straight line is minimized when the rotational angle of the detent plate is a second angle value that is different from the first angle value, and is maximized when the rotational angle of the detent plate is a fourth angle value that is different from the third angle value.

* * * * *